(12) United States Patent  
Komatsu et al.

(10) Patent No.: US 8,547,324 B2
(45) Date of Patent: Oct. 1, 2013

(54) ELECTROPHORETIC DISPLAY SHEET, ELECTROPHORETIC DISPLAY APPARATUS, AND ELECTRONIC DEVICE

(75) Inventors: Harunobu Komatsu, Matsumoto (JP); Hitoshi Yamamoto, Chino (JP); Akira Matsumoto, Chino (JP); Mitsuo Kushino, Kawabe-gun (JP); Tomoyuki Kuwamoto, Narashi (JP); Teruki Matsushita, Suita (JP)

(73) Assignees: Seiko Epson Corporation, Tokyo (JP); Nippon Shokubai Co., Ltd., Osaka (JP)

( * ) Notice: Subject to any disclaimer, the term of this patent is extended or adjusted under 35 U.S.C. 154(b) by 648 days.

(21) Appl. No.: 12/453,476

(22) Filed: May 12, 2009

(65) Prior Publication Data

US 2009/0315824 A1    Dec. 24, 2009

(30) Foreign Application Priority Data

May 13, 2008    (JP) .................... 2008-126375

(51) Int. Cl.
    *G09G 3/34*          (2006.01)
(52) U.S. Cl.
    USPC ............... 345/107; 430/31; 430/32; 359/296
(58) Field of Classification Search
    USPC ................. 345/76, 107; 359/252–253, 296; 430/31–38
    See application file for complete search history.

(56) References Cited

U.S. PATENT DOCUMENTS

| | | | |
|---|---|---|---|
| 5,324,603 A * | 6/1994 | Jin et al. | 430/39 |
| 5,745,094 A * | 4/1998 | Gordon et al. | 345/107 |
| 6,067,185 A * | 5/2000 | Albert et al. | 359/296 |
| 6,072,621 A * | 6/2000 | Kishi et al. | 359/296 |
| 6,221,267 B1 * | 4/2001 | Ikeda et al. | 216/24 |
| 6,271,823 B1 * | 8/2001 | Gordon et al. | 345/107 |
| 6,504,524 B1 * | 1/2003 | Gates et al. | 345/107 |
| 6,636,186 B1 * | 10/2003 | Yamaguchi et al. | 345/31 |
| 6,661,564 B2 * | 12/2003 | Tsujimura et al. | 359/296 |
| 6,751,007 B2 * | 6/2004 | Liang et al. | 359/296 |
| 6,853,477 B2 * | 2/2005 | Nomoto et al. | 359/296 |
| 6,885,495 B2 * | 4/2005 | Liang et al. | 359/296 |
| 7,053,882 B2 * | 5/2006 | Weisbuch et al. | 345/107 |
| 7,226,550 B2 * | 6/2007 | Hou et al. | 252/500 |
| 8,047,849 B2 * | 11/2011 | Ahn et al. | 434/114 |
| 8,068,089 B2 * | 11/2011 | Matsuda | 345/107 |

(Continued)

FOREIGN PATENT DOCUMENTS

| | | |
|---|---|---|
| JP | A-2006-065248 | 3/2006 |
| JP | A-2007-025206 | 2/2007 |
| JP | A-2007-065215 | 3/2007 |
| JP | A-2008-58358 | 3/2008 |

*Primary Examiner* — Alexander Eisen
*Assistant Examiner* — Sanjiv D Patel
(74) *Attorney, Agent, or Firm* — Oliff & Berridge, PLC

(57) ABSTRACT

An electrophoretic display sheet comprising a display layer, a first electrode, and second electrodes. The display layer has a plurality of reservoir portions filled with a dispersion liquid containing particles. Each of the plurality of reservoir portions has predetermined positions. When an electric field having a direction is generated by applying a voltage to between the first electrode and the second electrodes, the particles are locally gathered to the predetermined positions of each of the plurality of reservoir portions so as to make rows of the particles along the direction of the electric field in the dispersion liquid. The electrophoretic display sheet is capable of exhibiting both superior responsiveness (responsibility) and superior color display performance with high contrast in changing a display color.

16 Claims, 15 Drawing Sheets

(56) References Cited

U.S. PATENT DOCUMENTS

| | | | |
|---|---|---|---|
| 2004/0252360 A1* | 12/2004 | Webber et al. | 359/296 |
| 2005/0237599 A1* | 10/2005 | Takagi | 359/296 |
| 2006/0285196 A1* | 12/2006 | Miyazaki et al. | 359/296 |
| 2008/0048968 A1* | 2/2008 | Okada et al. | 345/107 |
| 2008/0291526 A1* | 11/2008 | Lin et al. | 359/296 |
| 2009/0153942 A1* | 6/2009 | Daniel et al. | 359/296 |

* cited by examiner

ELECTROPHORETIC DISPLAY SHEET, ELECTROPHORETIC DISPLAY APPARATUS, AND ELECTRONIC DEVICE

CROSS-REFERENCE TO RELATED APPLICATION

This application claims a priority to Japanese Patent Application No. 2008-126375 filed on May 13, 2008 which is hereby expressly incorporated by reference herein in its entirety.

BACKGROUND

1. Technical Field

The present invention relates to an electrophoretic display sheet, an electrophoretic display apparatus and an electronic device, and more specially relates to an electrophoretic display sheet, an electrophoretic display apparatus provided with the electrophoretic display sheet and an electronic device provided with the electrophoretic display apparatus.

2. Related Art

As disclosed in JP-A-2008-58358, there is known an electrophoretic display utilizing electrophoretic particles as an image display section of an electronic paper. The electrophoretic display has superior portability and thrifty power consumption. Therefore, the electrophoretic display is suitably used as the image display section of the electronic paper.

A display device (microcapsule-type electrophoretic display panel) is disclosed in JP-A-2008-58358. The display device includes a front electric plate, a back electric plate disposed opposite the front electric plate, and a capsule-type electrophoretic layer provided therebetween. In the capsule-type electrophoretic layer, a number of microcapsules in which a dispersion liquid is filled are included. In the dispersion liquid, positively-charged white particles and negatively-charged black particles (colored particles) are dispersed.

In such a display device, when a voltage is applied to between the front electric plate and the back electric plate, the white particles and the black particles dispersed in the microcapsules are moved to a predetermined direction, respectively. This makes it possible to change a color (display color) visibly observed through the front electric plate.

Concretely, the voltage is applied to between the front electric plate and the back electric plate so that the front electric plate is charged negatively and the back electric plate is charged positively. By doing so, the white particles are moved to the front electric plate and the black particles are moved to the back electric plate. As a result, the image color is changed to a white color.

Conversely, the voltage is applied to between the front electric plate and the back electric plate so that the front electric plate is charged positively and the back electric plate is charged negatively. By doing so, the white particles are moved to the back electric plate and the black particles are moved to the front electric plate. As a result, the image color is changed to a black color.

As described above, the display device utilizes the electrophoretic particles as disclosed in JP-A-2008-58358. In such a display device, it is required that the black particles are moved from the back electric plate to the front electric plate in order to change the display color from the white color to the black color. Therefore, it is required for the black particles to be moved in a long moving distance. A moving distance of the white particles in changing the display color from the black color to the white color is also the same as that of the black particles.

Therefore, in such a display device, when the display color is switched (changed) from the white color to the black color, a long period of time is required. In other words, there is a problem (first problem) in that responsiveness (reactivity) is poor when the display color is changed at a low.

Further, when the display color is changed to the white or black color, the white and black particles are moved to an opposite direction to each other in the microcapsules. Therefore, in the case where the display color is changed from the black color to the white color, the black particles are surrounded among a large number of white particles at the time of passing the white particles. As a result, there is a case that brightness of the white color is reduced. Therefore, there is another problem (second problem) in that display contrast is reduced and thus visibility of the display is made poor.

In this regard, in order to solve the first problem described above, it may be conceived to make a charge level of the white and black particles higher, thereby making mobility of these particles larger. However, if the charge level of the white and black particles is too high, the white and black particles are electrostatically-adsorbed to each other, thereby producing particle aggregates constituted of the white and black particles. Due to this particle aggregate, a problem is caused in that display contrast is reduced.

For these reasons, in the above display device disclosed in JP-A-2008-58358, it is difficult to satisfy both superior responsiveness and superior color display performance with high contrast in changing the display color.

SUMMARY

It is an object of the present invention to provide an electrophoretic display sheet being capable of exhibiting both superior responsiveness (reactivity) and superior color display performance with high contrast in changing a display color.

Further, it is another object of the present invention to provide an electrophoretic display apparatus (device) provided with such an electrophoretic display sheet, and an electronic device provided with such an electrophoretic display device.

These objects are achieved by the present invention described below.

In a first aspect of the present invention, there is provided an electrophoretic display sheet. The electrophoretic display sheet comprises: a display layer having one surface, the other surface being opposite to the one surface, and a plurality of reservoir portions provided between the one surface and the other surface, the plurality of reservoir portions being filled with a dispersion liquid containing particles, and the plurality of reservoir portions each having predetermined positions, wherein the particles exhibit an electrorheological effect and have at least one color; a first electrode provided on the one surface of the display layer; and second electrodes provided on the other surface of the display layer.

When an electric field having a direction is generated in the display layer by applying a voltage to between the first electrode and the second electrodes, the particles are locally gathered to the predetermined positions of each of the plurality of reservoir portions so as to make rows of the particles along the direction of the electric field in the dispersion liquid due to the electrorheological effect.

This makes it possible to exhibit both superior responsiveness (reactivity) and superior color display performance with high contrast in changing a display color.

In the electrophoretic display sheet according to the present invention, it is preferred that the at least one color of the particles is a white color.

This makes it possible to make a white display state in which the color of the particles can be clearly and visibly observed. Further, in the case where the other particles are used as the particles, it is possible to make a colored display state in which the color of the other particles can be clearly and visibly observed.

In the electrophoretic display sheet according to the present invention, it is preferred that an average particle size of the particles is in the range of 0.1 to 5 μm.

This makes it possible to reliably switch (change) one state in which the color of the particles can be visibly observed and the other state in which a color of the other particles can be visibly observed, thereby improving display contrast.

In the electrophoretic display sheet according to the present invention, it is preferred that an amount of the particles contained in the dispersion liquid is in the range of 15 to 35 wt %.

This makes it possible to reliably switch (change) one state in which the color of the particles can be visibly observed and the other state in which a color of the other particles can be visibly observed, thereby improving display contrast.

In the electrophoretic display sheet according to the present invention, it is preferred that each of the plurality of reservoir portions has a bottom surface, the display layer has a colored part on the bottom surface of the reservoir portion, and the colored part has a color being different from the at least one color of the particles.

This makes it possible to make one state in which the color of the particles can be visibly observed and the other state in which a color of the colored part can be visibly observed, thereby enabling two colors to be displayed.

In the electrophoretic display sheet according to the present invention, it is preferred that the electrophoretic display sheet is configured so as to be capable of making a first state and a second state.

The first state is a state that when the voltage is applied to between the first electrode and the second electrodes, the particles are locally gathered to the predetermined positions of the reservoir portion so as to make the rows of the particles in the dispersion liquid along the direction of the electric field, so that the colored part is visible through gaps between the rows of the particles, and a color in the reservoir portion visibly observed through the first electrode is the color of the colored part.

The second state is a state that when no voltage is applied to between the first electrode and the second electrodes, the particles locally gathered to the predetermined positions of the reservoir portion so as to make the rows of the particles in the dispersion liquid are re-dispersed in the dispersion liquid, so that the colored part is invisible, and a color in the reservoir portion visibly observed through the first electrode is the color of the particles.

This makes it possible to easily and reliably switch the first state and the second state.

In the electrophoretic display sheet according to the present invention, it is preferred that the reservoir portion includes colored particles, and the colored part is constituted from the colored particles.

This makes it possible to relatively easily form the colored part.

In the electrophoretic display sheet according to the present invention, it is preferred that the colored particles are fixed to the bottom surface of the reservoir portion.

This makes it possible to allow the colored particles to remain to the bottom surface of the reservoir portion despite a state whether or not an electric field is generated in the display layer. Therefore, it is possible to prevent the colored particles from being moved to the first electrode. As a result, in a state that the color of the colored particles is visibly observed as an image color, it is possible to display an original or a color of the colored particles themselves without somberness, color heterogeneity, and the like.

In the electrophoretic display sheet according to the present invention, it is preferred that the colored particles have a positively-charged particles or a negatively-charged particles.

This makes it possible to easily fix the colored particles to the bottom surface of the reservoir portion.

In the electrophoretic display sheet according to the present invention, it is preferred that the display layer is comprised of a base body in which the plurality of reservoir portions are formed; and a colored film provided between the base body and the second electrodes.

This makes it possible to relatively easily form the colored part. Since the colored film is not in contact with the dispersion liquid, deterioration of the colored film is prevented. That is, it is possible to prevent color fade-out or color heterogeneity from occurring in the colored film.

In the electrophoretic display sheet according to the present invention, it is preferred that the first electrode is locally provided on the one surface of the display layer at a position corresponding to the predetermined positions of the reservoir portion in a planar view of the display layer, wherein the particles are gathered to the predetermined positions in applying the voltage to between the first electrode and the second electrodes.

With the electrophoretic display sheet, since positions to which the particles are to be gathered can be determined in predetermined positions of the reservoir portion, it is possible to display a more clear color.

In the electrophoretic display sheet according to the present invention, it is preferred that the predetermined positions of the reservoir portion are a peripheral edge portion, the first electrode is provided on the one surface of the display layer corresponding to the peripheral edge portion of the reservoir portion in a planar view of the display layer.

With the electrophoretic display sheet, when the voltage is applied to between the first electrode and the second electrodes, it is possible to gather the particles to the peripheral edge portion of the reservoir portion. Therefore, it is possible to form a relatively large region in which no particles exist in a central portion of the reservoir portion. This makes it possible to clearly display a color of the colored part in a state that the color of the colored part is visibly observed as a display color.

In the electrophoretic display sheet according to the present invention, it is preferred that the predetermined positions of the reservoir portion are a central portion, the first electrode includes sub-first electrodes, and each of the sub-first electrodes is provided on the one surface of the display layer corresponding to the central portion of the reservoir portion in a planar view of the display layer.

With the electrophoretic display sheet, when the voltage is applied to between the first electrode and the second electrodes, it is possible to gather the particles to the central portion of the reservoir portion. Therefore, even if a region in which the particles exist in the central portion of the reservoir portion is formed, the color of the colored part is visibly observed through around the central portion of the reservoir portion. Therefore, it is possible to clearly display a color of the colored part in a state that the color of the colored part is visibly observed as a display color.

In a second aspect of the present invention, there is provided an electrophoretic display device. The electrophoretic display device comprises: the electrophoretic display sheet described above; and a substrate provided on the second electrodes of the electrophoretic display sheet.

This makes it possible to exhibit both superior responsiveness (responsibility) and superior color display performance with high contrast in changing a display color.

In the electrophoretic display device according to the present invention, it is preferred that the electrophoretic display device is configured so that the electric field is generated in each of the plurality of reservoir portions in a selectable manner.

This makes it possible to display images which are formed by gathering a number of pixels.

In a third aspect of the present invention, there is provided an electronic device. The electronic device is provided with the electrophoretic display device as described above.

This makes it possible to exhibit both superior responsiveness (reactivity) and superior color display performance with high contrast in changing a display color.

DESCRIPTION OF EXEMPLARY EMBODIMENTS

Hereinafter, an electrophoretic display sheet, an electrophoretic display apparatus (device), and an electronic device in accordance with the present invention will be described in detail with reference to preferred embodiments shown in the accompanying drawings.

Electrophoretic Display Device

First Embodiment

First, a description will be made on a first embodiment in which an electrophoretic display sheet according to the present invention is used in an electrophoretic display device (according to the present invention).

Figure 1:
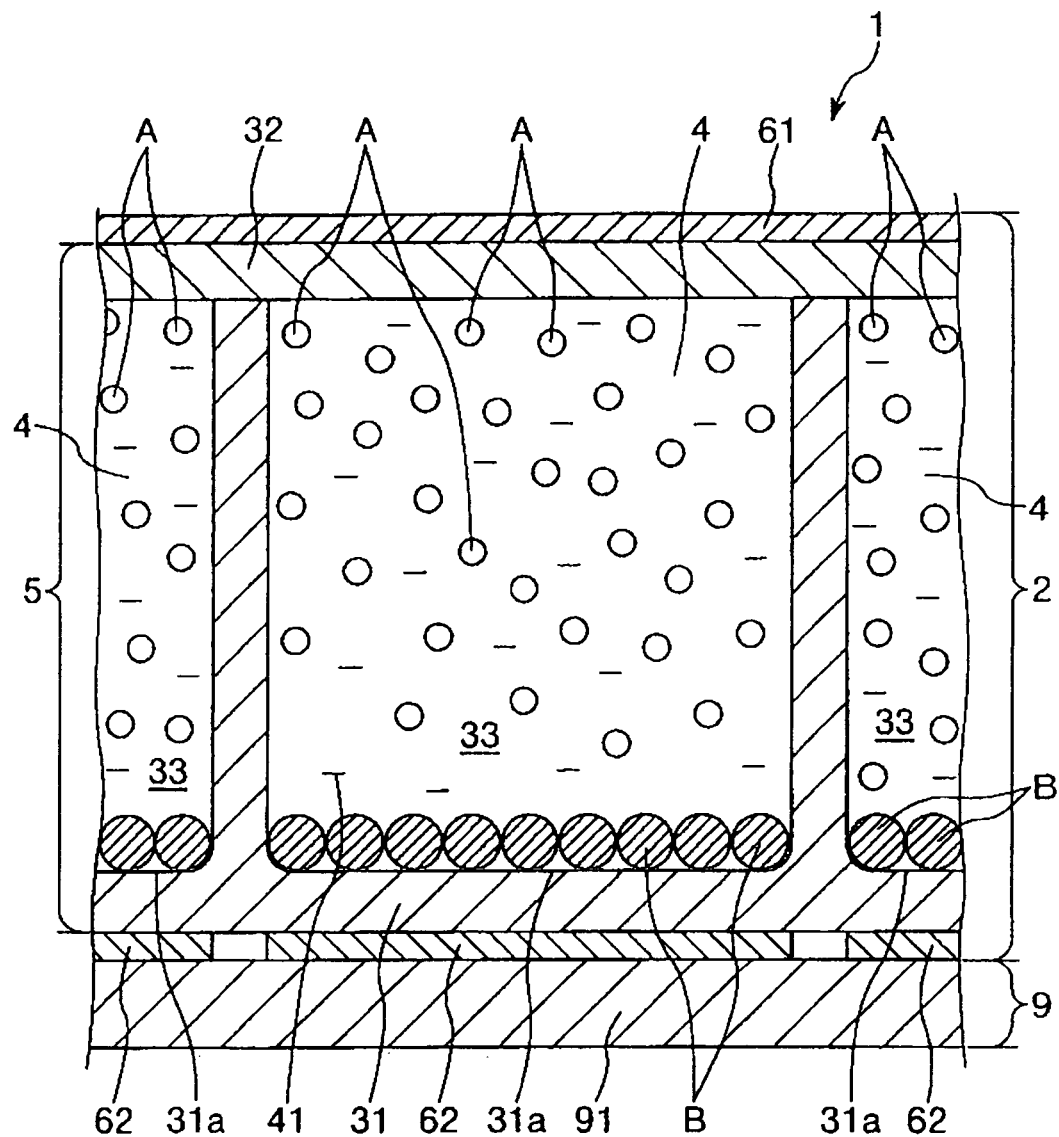
FIG. 1 is a vertical section view schematically showing an electrophoretic display device of a first embodiment according to the present invention.
Figure 2:
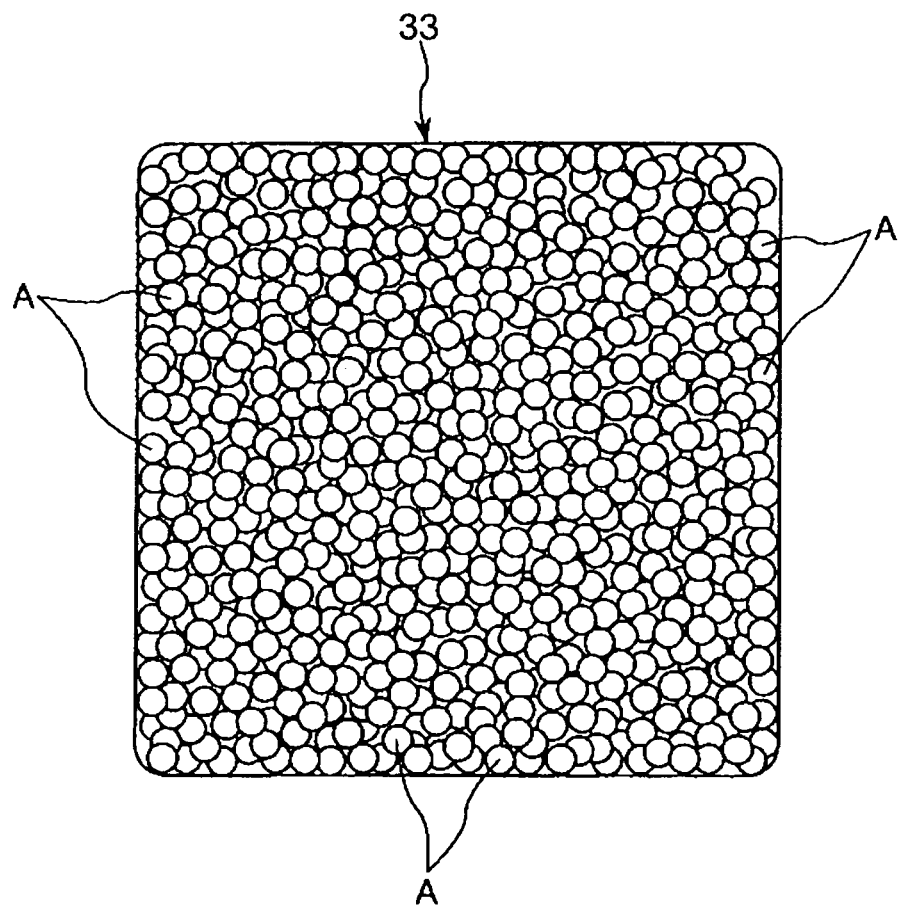
FIG. 2 is a plane view schematically showing a display section when the electrophoretic display device shown in FIG. 1 is viewed from above.
Figure 3:
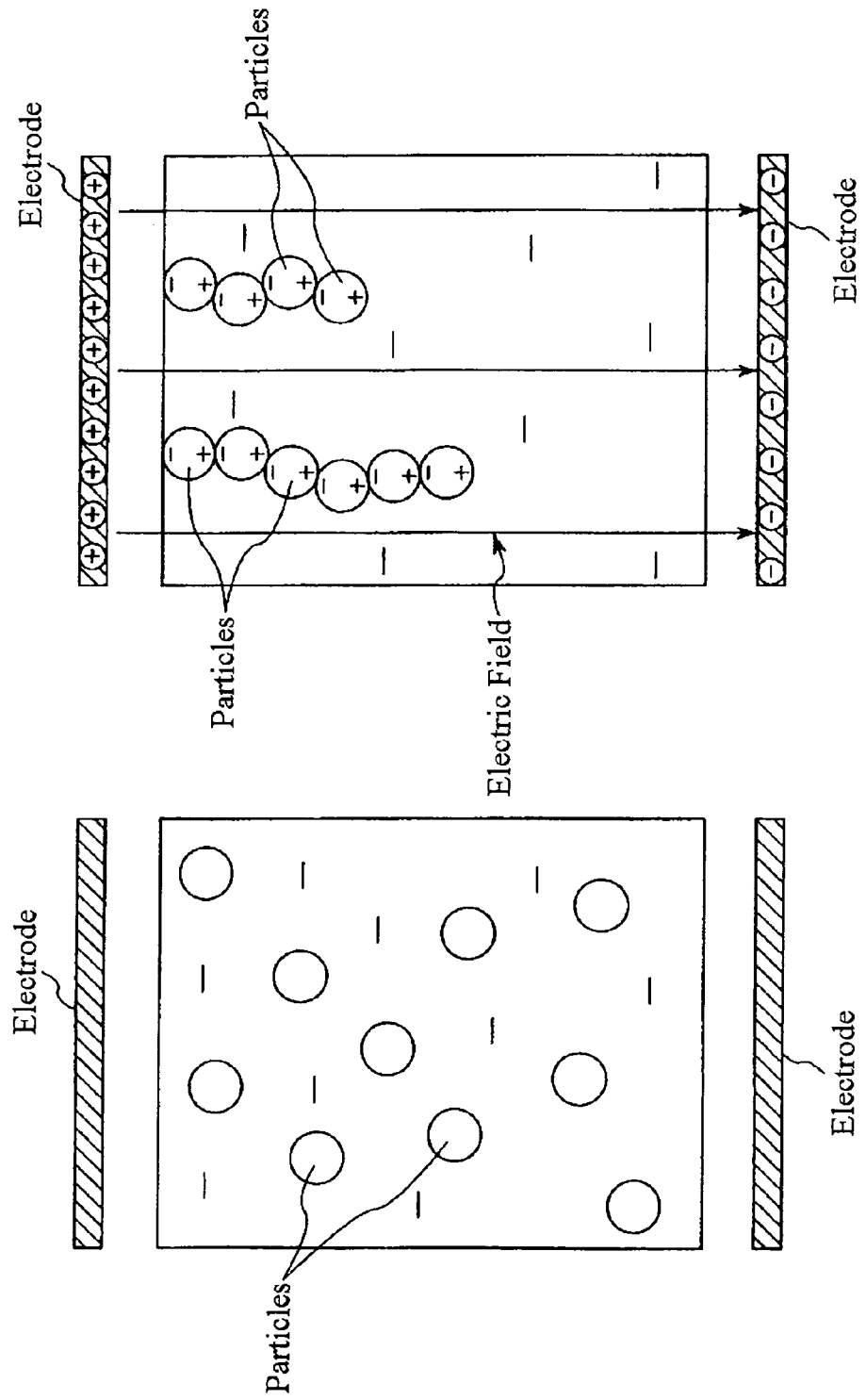
FIGS. 3A and 3B are schematically vertical section views for explaining an electrorheological effect of particles.
Figure 4:
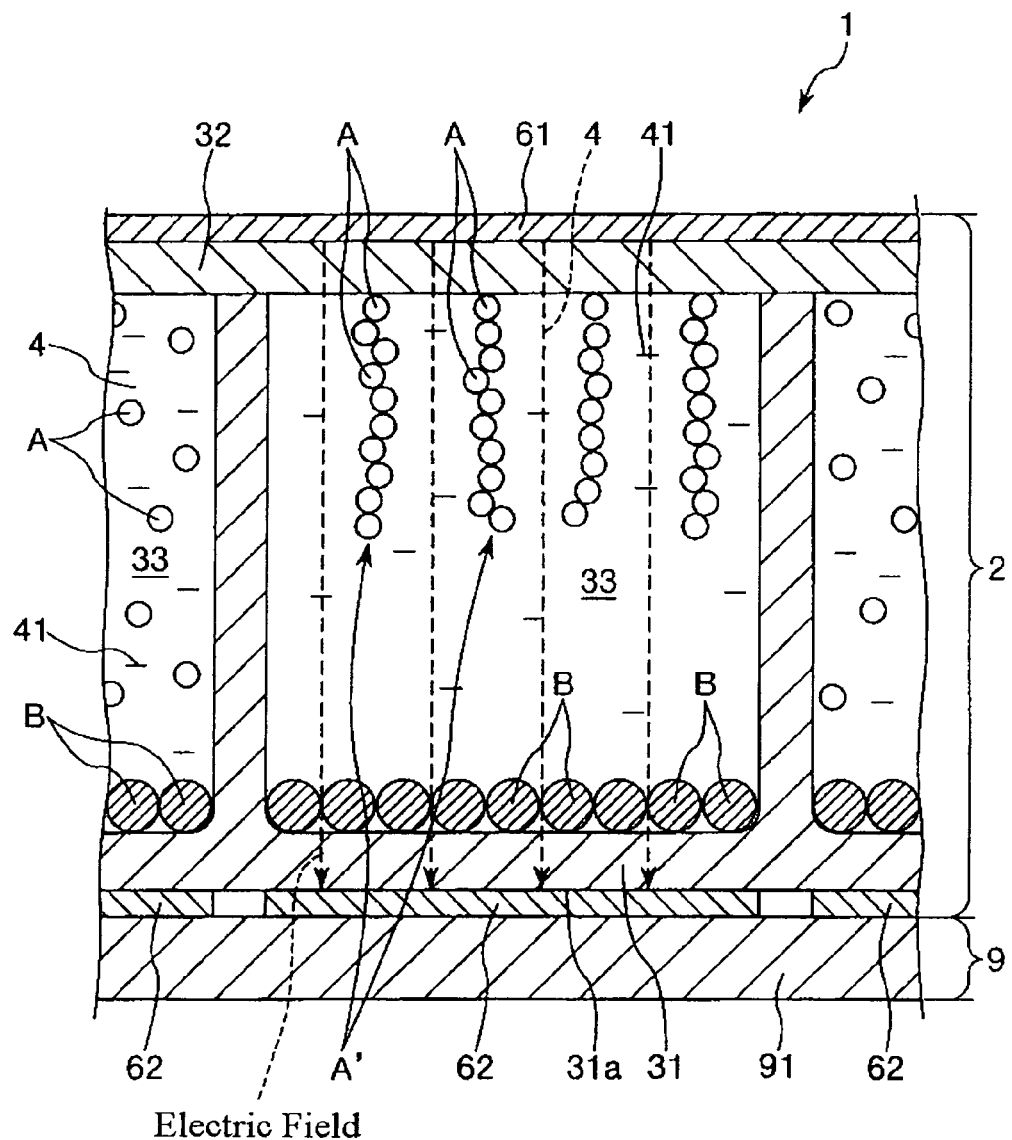
FIG. 4 is a schematically vertical section view for explaining an operating method of the electrophoretic display device shown in FIG. 1.
Figure 5:
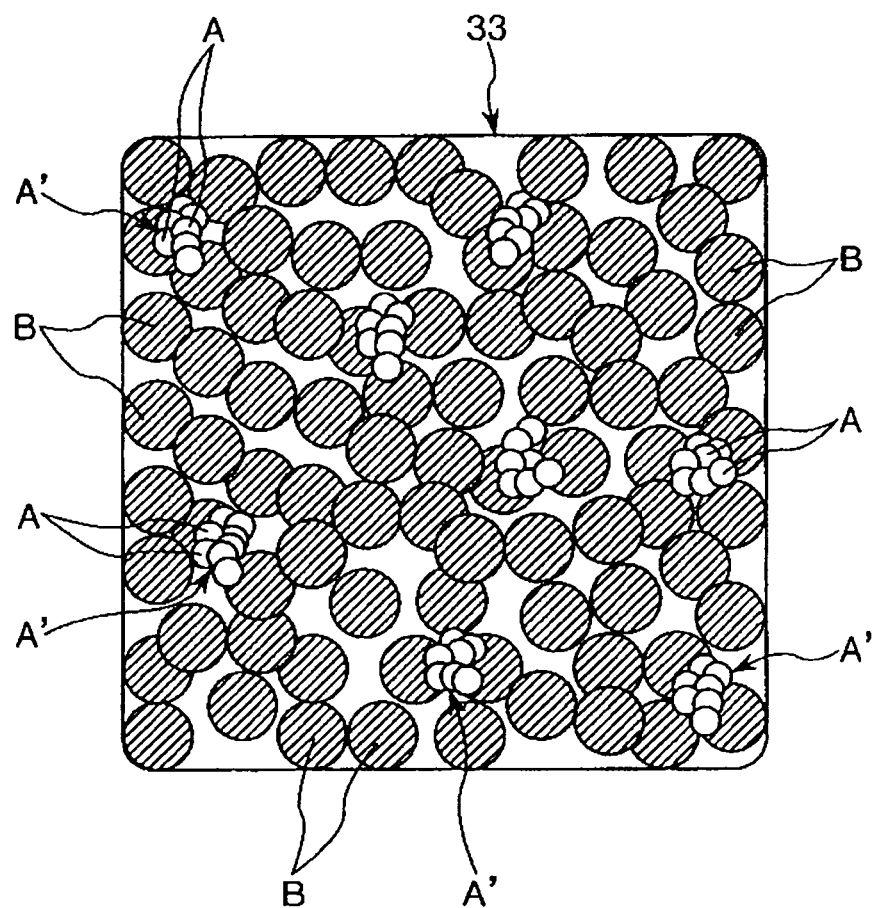
FIG. 5 is a plane view schematically showing a display section when the electrophoretic display device shown in FIG. 3B is viewed from above.

FIG. 1 is a vertical section view schematically showing an electrophoretic display device of a first embodiment according to the present invention. FIG. 2 is a plane view schematically showing a display section when the electrophoretic display device shown in FIG. 1 is viewed from above. FIGS. 3A and 3B are schematically vertical section views for explaining an electrorheological effect of particles. FIG. 4 is a schematically vertical section view for explaining an operating method of the electrophoretic display device shown in FIG. 1. FIG. 5 is a plane view schematically showing a display section when the electrophoretic display device shown in FIG. 3B is viewed from above.

Hereinafter, the upper side in FIGS. 1, 3A, 3B, and 4 will be referred to as "upper" and the lower side will be referred to as "lower" for the purpose of convenience in the description. Further, the front side of each of the sheets of FIGS. 2 and 5 will be referred to as "upper" and the back side of each of the sheets will be referred to as "lower" for the purpose of convenience in the description.

As shown in FIG. 1, the electrophoretic display device 1 is comprised from a circuit board (a back plane) 9 and an electrophoretic display sheet 2 bonded on an upper surface of the circuit board 9.

The circuit board 9 has a plane-shaped base portion 91 and a circuit (not shown) including switching elements such as TFT and the like. The circuit is provided on the base portion 91.

On the other hand, the electrophoretic display sheet 2 has a display layer 5, an upper electrode (first electrode) 61 provided on an upper surface of the display layer 5, and lower electrodes (second electrodes) 62 provided on a lower surface of the display layer 5.

The display layer 5 has a base body 31 in which a plurality of concave portions 31a are formed regularity (in a form of a matrix) by caving in a concave manner to a lower direction in FIG. 1. Additionally, the display layer 5 also has a cover body 32 provided on an upper surface of the base body 31 so as to cover an upper opening of each of the concave portions 31a.

The base body 31 and the cover body 32 are sealed airtightly. A plurality of reservoir portions 33 are partitioned by inner surfaces (which are constituted from inner walls and bottom surfaces) of the concave portions 31a and a lower surface of the cover body 32. In each of the plurality of reservoir portions 33, a dispersion liquid 4 which will be described later is filled (included). Hereinafter, a description will be made on one reservoir portion 33 in the plurality of reservoir portions 33 for the purpose of convenience in the description.

Although constituent materials of the base body 31 and the cover body 32 may be either flexible or rigid, it is preferred that the constituent materials of the base body 31 and the cover body 32 have flexibility. Use of the constituent materials having the flexibility makes it possible to provide a flexible electrophoretic display device 1, namely, an electrophoretic display device 1 useful in constructing, e.g., an electronic paper.

In the case where the base body 31 and the cover body 32 are flexible, examples of the constituent materials thereof include a polyolefin such as polyethylene, polypropylene, and an ethylene-vinyl acetate copolymer; a modified polyolefin; a polyamide such as nylon 6 nylon 4-6, nylon 6-6, nylon 6-10, nylon 6-12, nylon 11, nylon 12, nylon 6-12, and nylon 6-66; a thermoplastic polyimide; a liquid crystal polymer such as an aromatic polyester; polyphenyleneoxide, polyphenylenesulfide, a polycarbonate, polymethylmethacrylate, a polyether, a polyether ether ketone, a polyetherimide, a polyacetal, various kinds of thermoplastic elastomers such as a styrene-based elastomer, a polyolefin-based elastomer, a polyvinyl chloride-based elastomer, a polyurethane-based elastomer, a polyester-based elastomer such as polyethylene terephthalate (PET), a polyamide-based elastomer, a polybutadiene-based elastomer, a transpolyisoprene-based elastomer, a fluorocarbon rubber-based elastomer, and a chlorinated polyethylene-based elastomer; copolymers mainly constituted of the above materials; blends mainly constituted of the above materials; polymer alloys mainly constituted of the above materials; and the like. One or more of these materials may be used independently or in combination.

In the base body 31 and the cover body 32, at least the cover body 32 is optically transparent, i.e., substantially transparent (clear and colorless, clear and colorful, or translucent).

This makes it possible to easily recognize, through visual observation from the above of the electrophoretic display device 1 (upper electrode 61 side), a state of the first particles (particles) A and the second particles (colored particles) B in the dispersion liquid 4 filled into the reservoir portion 33 described below, i.e., information (images) displayed by the electrophoretic display device 1.

In this regard, a thickness of the display layer 5 (namely, a distance between the upper surface of the cover body 32 and the lower surface of the base body 31) is not particularly limited to a specific value, but is preferably in the range of about 10 to 500 μm, and more preferably in the range of about 20 to 100 μm.

Next, a description will be made on a dispersion liquid 4 which is filled into each reservoir portion 33. In this regard, since the dispersion liquids 4 filled into the reservoir portions 33 are identical to each other, the following description will be made as a representative the dispersion liquid 4 filled into one reservoir portion 33, and explanations for dispersion liquids 4 filled into the other reservoir portions 33 are omitted.

As shown in FIG. 1, the dispersion liquid 4 includes first particles A having a color, second particles B having a color which is different from the color of the first particles A, and a dispersion medium 41.

The dispersion medium 41 is preferably substantially clear and colorless. It is preferred that materials having relatively high insulation property are used as such a dispersion medium 41. Examples of the dispersion medium 41 include: various kinds of water (e.g., distilled water, deionized water; and ion-exchanged water); alcohol such as methanol, ethanol, butanol and the like; cellosolve such as methyl cellosolve and the like; an ester such as methyl acetate, ethyl acetate, and the like; a ketone such as acetone, methyl ethyl ketone and the like; an aliphatic hydrocarbon such as pentane and the like; an alicyclic hydrocarbon such as cyclohexane, and the like; an aromatic hydrocarbon including benzene with a long-chain alkyl group, such as benzene, toluene, and the like; a halogenated hydrocarbon such as methylene chloride, chloroform, and the like; an aromatic heterocycle such as pyridine, pyrazine, and the like; a nitrile such as acetonitrile, propionitrile, and the like; an amide such as N,N-dimethylformamide, and the like; a carboxylic salt; a mineral oil such as liquid paraffin and the like; a vegetable oil such as linoleic acid, linolenic acid, oleic acid, and the like; silicone oil such as dimethyl silicone oil, methylphenyl silicone oil, methylhydrogen silicone oil, and the like; fluoro-based liquid such as hydrofluoroether and the like; and various kinds of oil. One or more of them may be used independently or in combination.

If necessary, various kinds of additive may be added to the dispersion medium 41 (dispersion liquid 4). Examples of such an additive include: a charge-controlling agent formed of particles of an electrolyte, a (anionic or cationic) surfactant, a metal soap, a resin material, a rubber material, an oil, a varnishe, compounds or the like; a dispersion agent such as a titanium-based coupling agent, an aluminum-based coupling agent, a silane-based coupling agent and the like; a lubricating agent; and a stabilizing agent.

Examples of such a surfactant include alkenyl succinate ester, alkenyl succinate polyimide, and the like.

Next, a description will be made on the first particles A and the second particles B included in the dispersion liquid 4, respectively.

The color of the first particles A is different from the color of the second particles B. The colors of the first particles A and the second particles B are not particularly limited to any specific color as long as the colors thereof are different from each other. Examples of the colors of the first particles A and the second particles B include: an achromatic color such as a white color, a black color, and an intermediate color therebetween (gray color); and a chromatic color such as a red color, a blue color, and a green color.

A combination between the colors of the first particles A and the second particles B is not particularly limited to any specific combination. Examples of the combination between the colors of the first particles A and the second particles B include a combination in which the first particles A are white particles and the second particles B are black particles, a combination in which the first particles A are blue particles and the second particles B are red particles, and the like.

In this embodiment, a description will be made on the combination in which the first particles A are the white particles and the second particles B are the black particles. In other words, the description will be made on the combination in which the color of the first particles A is the white color and the color of the second particles B is the black color.

The first particles A are particles having relatively large dielectric constant, which exhibit an electrorheological effect. This "electrorheological effect" means the follow property. When an electric field does not work in the reservoir portion 33 (display layer 2), the first particles A are dispersed in the dispersion medium 41 as shown in FIG. 3A.

On the other hand, when the electric field works for the reservoir portion 33, dielectric polarization is caused to the first particles A to thereby generate dipole in the first particles A. Then, one particle and the other particle among the first particles A are pulled therebetween by an electric force due to the their dipoles.

As a result, the first particles A are gathered (in chains) to predetermined positions of the reservoir portion 33 (of the lower surface of the cover body 32) and arranged so as to make rows along a direction of the electric field. In this regard, each row is comprised of a plurality of particles coupled in a beaded fashion.

In the case where no electric field is generated in the reservoir portion 33, that is, no voltage is applied to between the upper electrode 61 and the lower electrodes 62, the first particles A are dispersed in the dispersion medium 41 as shown in FIG. 1.

However, when the electric field is generated in the reservoir portion 33, that is, a voltage is applied to between the upper electrode 61 and the lower electrodes 62, the first particles A are gathered so as to make the rows in a vertical direction (the direction of the electric field) as shown in FIG. 3B.

Hereinafter, it is to be noted that an aggregate in which the large number of first particles A are produced by gathering together is simply referred to as "particle aggregate A'".

It is preferred that a dielectric constant of each of such first particles A is larger than that of the dispersion medium 41. This makes it possible to reliably allow the dielectric polarization to occur to the first particles A when the voltage is applied to between the upper electrode 61 and the lower electrodes 62.

The first particles A are globally-neutral particles. In other words, the first particles A have an electric charge of substantially 0 (zero) when no electric field is generated in the reservoir portion 33. This makes it possible to prevent the first particles A from being moved (electrophoresed) to the upper electrode 61 or the lower electrodes 62 so as to be electrically adsorbed in a case where the voltage is applied to between the upper electrode 61 and the lower electrodes 62. It is also possible to more reliably make a state in that the first particles A are gathered together so as to make the rows of the first particles A as shown in FIG. 3B.

The color of the first particles A is not limited to a specific color as described above, but is preferably the white color among the colors described above. This makes it possible to make both a white display state and a black display state.

An average particle diameter of the first particles A is not limited to a specific value, but is preferably in the range of about 0.1 to 5 μm, and more preferably in the range of about 0.1 to 3 μm.

By setting the average particle diameter of the first particles A within the above range, in a state (no voltage applied state) shown in FIG. 1, it is possible to improve dispersibility of the first particles A. Further, in a state (voltage applied state) shown in FIG. 4, it is possible to decrease a visible ratio of the particle aggregates A' with respect to the opening area of the reservoir portion 33 in a planar view of the display layer 5 (as shown in FIG. 5).

Furthermore, by setting the average particle diameter of the first particles A within the above range, it is possible to lower gaps among the first particles A in a state that the first particles are dispersed in the dispersion medium 41, thereby enabling a clearly white color to be displayed. Therefore, it is possible to reliably to switch the white display state and the black display state, and clearly display a white color and a black color, respectively.

In contrast, if the average particle diameter of the first particles A is smaller than the lower limit value noted above, it is impossible to sufficiently obtain contrast ratio of the first particles A in a mainly visual light range. As a result, there is a fear that the display contrast of the electrophoretic display device 1 is reduced.

On the other hand, if the average particle diameter of the first particles A exceeds the upper limit value noted above, the visible ratio of the particle aggregates A' with respect to the opening area of the reservoir portion 33 in the planar view of the display layer 5 becomes large. As a result, there is a fear that the display contrast of the electrophoretic display device 1 is reduced.

Further, it is possible to allow the first particles A to easily settle down in the dispersion liquid 4 depending on a kind of constituent material of the first particles A. As a result, there is a fear that a problem in that display quality of the electrophoretic display device 1 is lowered occurs.

An amount of the first particles A included in the dispersion liquid 4 is preferably in the range of about 15 to 35 wt %, and more preferably in the range of about 20 to 30 wt %.

By setting the amount of the first particles A within the above range, when the reservoir portion 33 is visibly observed from the above of electrophoretic display device 1 in the state (no voltage applied state) shown in FIG. 1, it is possible to disperse the first particles A of a sufficient amount in the dispersion medium 41 so that the second particles B can not be visibly observed.

Further, in the state (voltage applied state) shown in FIG. 3B, it is possible to sufficiently reduce the visible ratio of the particle aggregates A' with respect to the opening area of the reservoir portion 33 in the planar view of the display layer 5.

Therefore, it is possible to reliably to switch the white display state and the black display state, and clearly display a white color and a black color, respectively.

In contrast, if the amount of the first particles A is smaller than the lower limit value noted above, an amount of the first particles A dispersing in the dispersion medium 41 become insufficient, though depending on the size of the first particles A. As a result, when the reservoir portion 33 is visibly observed from the above of electrophoretic display device 1, the second particles B can not be visibly observed. That is, the second particles B are invisible. Therefore, there is a fear that the display contrast of the electrophoretic display device 1 is reduced.

That is to say, brightness of the white color is reduced in the white display state, thereby there is a fear that a gray color (light gray color) instead of the white color is visibly observed as the display color.

On the other hand, if the amount of the first particles A exceeds the upper limit value noted above, the visible ratio of the particle aggregates A' with respect to the opening area of the reservoir portion 33 in the planar view of the display layer 5 becomes large. As a result, there is a fear that the display contrast of the electrophoretic display device 1 is reduced. That is to say, brightness of the black color is increased in the black display state, thereby there is a fear that a gray color (dark gray color) instead of the black color is visibly observed as the display color.

Next, a description will be made on the second particles B.

As shown in FIG. 1, the second particles B are unevenly distributed (gathered) in the lower side (bottom surface) of the reservoir portion 33. Therefore, in the electrophoretic display device 1, the second particles B are positioned on the bottom surface of the reservoir portion 33 and the first particles A are positioned (dispersed) above the second particles B.

By unevenly distributing (gathering) the second particles B on the bottom surface of the reservoir portion 33, it is possible to form a colored part B' of which color is different from that of the first particles A. By producing such a colored part B', it is possible to make a white display state and a black display state, thereby enabling a monochrome (two colors display) to be displayed.

Further, it is possible to relatively easily form the colored part B' by constituting the colored part B' from the second particles B.

In this embodiment, the second particles B are fixed (bonded) to the bottom surface (an inner surface) of the reservoir portion 33 and therefore are in a state not to be able to be moved in the dispersion medium 41.

Therefore, the second particles B remain on the bottom surface of the reservoir portion 33 despite a state whether or not an electric field is generated in the reservoir portion 33. This makes it possible to reliably maintain the colored part B'. Further, it is possible to prevent the second particles B from being moved to the upper electrode 61 by working of vibration or the electric field.

As a result, in the white display state, it is possible for the electrophoretic display device 1 to display a white color (namely, an original or a color of the first particles A themselves) without somberness, color heterogeneity, and the like.

It is preferred that negatively-charged or positively-charged particles (electrophoretic particles) are used as such second particles B. This makes it possible to relatively easily fix the second particles B to the bottom surface of reservoir portion 33, which will be described later. Hereinafter, a description will be made as a representative the negatively-charged particles as the second particles B for the purpose of convenience in the description.

First, in a state that the second particles B are dispersed in the dispersion medium 41, a relatively strong voltage is applied to between the upper electrode 61 and the lower electrodes 62 for a long period of time so that the upper electrode 61 is charged negatively and the lower electrodes 62 are charged positively. By doing so, the second particles B are moved (electrophoresed) to the lower electrodes 62, and then the second particles B are reached to the bottom surface of the reservoir portion 33.

Next, the relatively strong voltage is kept applying to between the upper electrode 61 and the lower electrodes 62 for a long period of time even after the second particles B have been reached to the bottom surface of the reservoir portion 33. By doing so, the second particles B are allowed to thermally attach to the bottom surface of the reservoir portion 33.

As a result, the second particles B are fixed (bonded) to the bottom surface of the reservoir portion 33. According to such a method, it is possible to more reliably and easily fix the second particles B to the bottom surface of the reservoir portion 33.

An average particle diameter of such second articles B is not limited to a specific value, but is preferably in the range of about 0.1 to 5 µm, and more preferably in the range of about 0.1 to 3 µm.

If the average particle diameter of the second particles B is smaller than the lower limit value noted above, a contact area between the second particles B and the bottom surface of the reservoir portion 33 is reduced. Therefore, there is a case that the second particles B can not be sufficiently fixed to the bottom surface of the reservoir portion 33.

This depends on time of applying the voltage to between the upper electrode 61 and the lower electrodes 62 and degree of the voltage to be applied to therebetween, which are required to fix the second particles B to the bottom surface of the reservoir portion 33.

On the other hand, if the average particle diameter of the second particles B exceeds the upper limit value noted above, gaps among the second particles B become large. Therefore, there is a fear that the display contrast of the electrophoretic display device 1 is reduced.

The first particles A and the second particles B as described above may be of any type as long as they are satisfied conditions as described above. Although there is no particular limitation, at least one of pigment particles, resin particles, ceramic particles and composite particles thereof may be preferably used as the first particles A and the second particles B.

These kinds of particles provide advantages in that they can be manufactured with ease and can perform a charge-controlling task in a relatively easy manner. Alternatively, at least one of metal particles, metal oxide particles and composite particles thereof may be preferably used as the first particles A and the second particles B.

Examples of a pigment of which pigment particles are made include: a black pigment such as aniline black, carbon black, titanium black, and the like; a white pigment such as titanium dioxide, antimony trioxide, zinc sulfide, zinc oxide, and the like; an azo-based pigment such as monoazo, disazo, polyazo and the like; a yellow pigment such as isoindolinone, chrome yellow, yellow iron oxide, cadmium yellow, titanium yellow, and the like; a red pigment such as quinacridone red, chrome vermilion and the like; a blue pigment such as phthalocyanine blue, indanthrene blue, iron blue, ultramarine blue, cobalt blue and the like; and a green pigment such as phthalocyanine green and the like. One or more of these pigments may be used independently or in combination.

Examples of a resin material of which resin particles are made include an acrylic-based resin, an urethane-based resin, an urea-based resin, an epoxy-based resin, a rosin resin, polystyrene, polyester, an ABS resin manufactured by copolymerizing styrene and acrylonitrile and the like. One or more of these resin materials may be used independently or in combination.

Examples of the composite particles include: particles produced by coating the surfaces of the pigment particles with the resin material; particles produced by coating the surfaces of the resin particles with the pigment; and particles made of a mixture obtained by mixing the pigment and the resin material in a suitable composition ratio.

For the purpose of improving dispersibility of the first particles A in the dispersion medium 41, a polymer having high affinity to the dispersion medium 41 can be physically adsorbed or chemically bonded to the surfaces of the first particles A. Among these, from the point of view of eliminating or bonding of the polymer from or to the surfaces of the first particles A, respectively, it is preferred that the polymer is chemically bonded to the surfaces of the first particles A. According to such a constitution, an apparent specific gravity of the first particles A work thereto so as to reduce, thereby it is possible to improve affinity, that is, dispersibility of the first particles A to the dispersion medium 41.

In this case, a bonding number of the polymer to be bonded to the first particles A is preferably in the range of about 300 to 2500 unit/$\mu m^2$, and more preferably in the range of about 500 to 1600 unit/$\mu m^2$ in one first particle A. By setting the bonding number of the polymer within the above range, it is possible to improve affinity of the first particles A to the dispersion medium 41, thereby enabling the dispesibility of the first particles A to be improved.

Examples of such a polymer include: a polymer which has groups reacting with the first particles A and functional groups having charge property; a polymer which has groups reacting with the first particles A and long alkyl chains, long ethylene oxide chains, long alkyl fluoride chains, or long dimethyl silicone chains; a polymer which has groups reacting with the first particles A, functional groups having charge property, and long alkyl chains, long ethylene oxide chains, long alkyl fluoride chains, or long dimethyl silicone chains; and the like.

In the polymer as described above, examples of the groups reacting with the first particles A (hereinafter, simply referred to as "reactive groups") include a epoxy group, thioepoxy group, an alkoxysilane group, a silanol group, an alkylamido group, an aziridine group, an oxazin group, an isocyanate group, and the like. One or more of these reactive groups may be used independently or in combination. These reactive groups may be selected by depending on a kind of constituent materials of the first particles A to be used.

As described above, the description is made on the first particles A and the second particles B. A task of dispersing the first particles A and the second particles B in the dispersion medium 41 can be performed by using one or more of, e.g., a paint shaker method, a ball mill method, a media mill method, an ultrasonic dispersion method and a stirrer dispersion method.

Next, a description will be made on each of the upper electrode 61 and the lower electrodes 62 for generating an electric field in the display layer 5.

The upper electrode 61 is provided on an upper surface of the display layer 5. The lower electrodes 62 are provided on a lower surface of the display layer 5.

The upper electrode 61 and the lower electrodes 62 are of a film shape (sheet shape), respectively. When a voltage is applied to between the upper electrode 61 and the lower electrodes 62, the electric field is generated therebetween. Therefore, this electric field works to the display layer 5.

In this embodiment, the upper electrode 61 serves as a common electrode and the lower electrodes 62 function as individual electrodes divided in a form of a matrix (line) (pixel electrodes connected to the switching elements). A portion where the upper electrode 61 is overlapped with one of the lower electrodes 62 constitutes a unit pixel.

In this embodiment, each of the lower electrodes 62 is provided on the lower surface of the display layer 5 so as to correspond to the reservoir portion 33. That is, one lower electrode 62 is provided under the one reservoir portion 33. Therefore, the one reservoir portion 33 is included in the unit pixel. Therefore, in this embodiment, the display electrophoresis device 1 is configured so that the electric field is generated in the one reservoir portion 33 in a selectable manner. That is, it is selectable that a voltage can be applied to and not be applied to between the upper electrode 61 and the one lower electrode 62. In this regard, it is to be noted that the upper electrode 61 may also be divided into a plurality of electrodes as well as the lower electrodes 62.

A constituent material of each of the upper electrode 61 and the lower electrodes 62 is not particularly limited to a specific type as long as it is substantially conductive. Various kinds of conductive materials may be used as the constituent material of each of the upper electrode 61 and the lower electrodes 62.

Examples of such a conductive material include: a metallic material such as copper, aluminum, nickel, cobalt, platinum, gold, silver, molybdenum, tantal or alloy containing these metals; a carbon-based material such as carbon black, carbon nanotube, or fullerene; an electronically-conductive polymer material such as polyacetylene, polypyrrole, polythiophene, polyaniline, poly(p-phenylene), poly(p-phenylene vinylene), polyfluorene, polycarbazole, polysilane or derivatives thereof; an ion-conductive polymer material produced by dispersing an ionic substance such as $NaCl$, $LiClO_4$, $KCl$, $H_2O$, $LiCl$, $LiBr$, $LiI$, $LiNO_3$, $LiSCN$, $LiCF_3SO_3$, $NaBr$, $NaI$, $NaSCN$, $NaClO_4$, $NaCF_3SO_3$, $KI$, $KSCN$, $KClO_4$, $KCF_3SO_3$, $NH_4I$, $NH_4SCN$, $NH_4ClO_4$, $NH_4CF_3SO_3$, $MgCl_2$, $MBr_2$, $MgI_2$, $Mg(NO_3)_2$, $MgSCN_2$, $Mg(CF_3SO_3)_2$, $ZnCl_2$, $ZnI_2$, $ZnSCN_2$, $Zn(ClO_4)_2$, $Zn(CF_3SO_3)_2$, $CuCl_2$, $CuI_2$, $CuSCN_2$, $Cu(ClO_4)_2$, or $Cu(CF_3SO_3)_2$ in a matrix resin such as polyvinyl alcohol, polycarbonate, polyethylene oxide, polyvinyl butyral, polyvinyl carbazole, or vinyl acetate; and a conductive oxide material such as indium tin oxide (ITO), fluorine-doped tin oxide (FTO), tin oxide ($SnO_2$), or indium oxide (IO); and the like. One or more of these materials may be used independently or in combination.

As other constituent materials of the upper electrode 61 and the lower electrodes 62, various kinds of composite materials can be also used. The various kinds of composite materials introduce conductivity by mixing a conductive material (conductive particles) such as gold, silver, nickel, and carbon into a material having no conductivity such as a glass material, a rubber material, and a polymer material.

Examples of such composite materials include: a conductive rubber which is produced by mixing the conductive material in a rubber material; a conductive adhesive agent or a conductive paste which is produced by mixing the conductive material in an adhesive agent composition such as an epoxy-based adhesive agent composition, an urethane-based adhesive agent composition, and an acryl-based adhesive agent composition; and a conductive resin which is produced by mixing the conductive material in a matrix resin such as polyolefin, polyvinyl chloride, polystyrene, an ABS resin, nylon (polyamide), an ethylene vinyl acetate copolymer, a polyester, an acryl-based resin, or an urethane-based resin.

An average thickness of each of the upper electrode 61 and the lower electrodes 62 is not particularly limited to a specific value, but may be arbitrarily set depending on the constituent material and use thereof. The average thickness of each of the upper electrode 61 and the lower electrodes 62 is preferably in the range of about 0.05 to 10 μm, and more preferably in the range of about 0.05 to 5 μm.

Among the upper electrode 61 and the lower electrodes 62, at least the upper electrode 61 is optically transparent, i.e., substantially transparent (clear and colorless, clear and colorful, or translucent).

This makes it possible to easily recognize, through visual observation, a state of the first particles A and the second particles B in the dispersion liquid 4, i.e., information (images) displayed by the electrophoretic display device 1.

The upper electrode 61 and the lower electrodes 62 may be have a monolayer structure which is constituted of elemental substances of the materials as described above. In addition to that, the upper electrode 61 and the lower electrodes 62 may be have a multilayer structure which is formed by sequentially laminating each of layers of various kinds of materials.

In other words, the upper electrode 61 and the lower electrodes 62 may be have a monolayer structure constituted of ITO, or two layers structure constituted of a ITO layer and a polyaniline layer. As described above, the description has been made on in detail the electrophoretic display device 1 according to the first embodiment.

Operating Method of Electrophoretic Display Device 1

Next, a description will be made on an operating method of the electrophoretic display device 1 based on FIGS. 1, 2, 4, and 5. In this regard, FIGS. 1, 2, 4, and 5 are schematic views for the purpose of convenience in the description, respectively. It is to be noted that a number and a size of each of the first particles A and the second particles B are greatly different from those of first particles A and second particles B of an actual electrophoretic display device.

FIGS. 2 and 5 are the plane views schematically showing display sections when the electrophoretic display device 1 is viewed from the above, respectively. For the purpose of convenient in the description, only one reservoir portion 33 is shown in FIGS. 2 and 5, and the others are omitted in FIGS. 2 and 5.

In this description, the first particles A are white particles and the second particles B are black particles. In other words, the color of the first particles is a white color and the color of the second particles B is a black color.

<1> White Display (White Display State)

First, a description will be made on a method of displaying the white color in the display section of the electrophoretic display device 1.

In case where no electric field is generated in the display layer 5 (reservoir portion 33), the first particles A are dispersed in the dispersion medium 41. In this sate, when the reservoir portion 33 is viewed from the above of the electrophoretic display device 1, only the first particles A of the white color can be visibly observed in the reservoir portion 33 as shown in FIG. 2. That is, the second particles B can not be visibly observed in the reservoir portion 33.

Therefore, the white color is visible as a display color of the electrophoretic display device 1. This state is referred to as a second state. In this regard, the display color is a color within the reservoir portion 33 which can be visibly observed when the reservoir portion 33 is viewed from the above of the electrophoretic display device 1 through the upper electrode 61.

<2> Black Display (Black Display State)

Next, a description will be made on a method of displaying the black color in the display section of the electrophoretic display device 1.

As shown in FIG. 4, a voltage is applied to between the upper electrode 61 and the lower electrodes 62 so that the upper electrode 61 is charged negatively and the lower electrodes 62 are charged positively. By so doing, an electric field is generated between the upper electrode 61 and the lower electrodes 62. In other words, the electric field is generated in the reservoir portion 33. By working of this electric field, dielectric polarization is caused to the number of first particles A.

The first particles A causing the dielectric polarization are attracted to each other by electric force (electrostatic attractive force) due to dipoles thereof. Then, the first particles A are locally gathered together in predetermined positions of the reservoir portion 33 so as to make rows along a direction of the electric field (vertical direction).

As a result, one or more particle aggregates A' are formed in the reservoir portion 33. At this time, one end particle each of the particle aggregates A' is allowed to adhere to the lower surface of the cover body 32. In this case, it is difficult to predict arrangements of the particle aggregates A' in the reservoir portion 33.

However, the following cases are supposed as such arrangements. One case is that a plurality of particle aggregates A' are closely arranged to each other in the reservoir portion 33. The other case is that a plurality of particle aggregate A' are irregularly arranged to each other in the reservoir portion 33.

In such a state (case), when the reservoir portion 33 is viewed from the above of the electrophoretic display device 1, the second particles B of the black color (colored part B'), which are positioned on the bottom surfaces of the reservoir portion 33, can be visibly observed from between the plurality of particle aggregates A' in the reservoir portion 33 as shown in FIG. 5. Therefore, the black color is visible as a display color of the electrophoretic display device 1. This state is referred to as a first state.

While the electric field is generated between the upper electrode 61 and the lower electrodes 62, the black display state is maintained. However, no voltage is applied to between the upper electrode 61 and the lower electrodes 62, and then the electric field disappears. By doing so, the first particles A are re-dispersed in the dispersion medium 41 (that is, this is states as shown in FIGS. 1 and 2), thereby returning to the white display state.

In this regard, it is to be noted that even if no voltage is applied to between the upper electrode 61 and the lower electrodes 62, the black display state can be maintained by the use of a dispersion medium having a relatively high viscosity. Examples of such a dispersion medium include Isopar M and the like. The viscosity of such a dispersion medium is preferably about 2 mPa·S.

In the above description, the voltage is applied to between the upper electrode 61 and the lower electrodes 62 so that the upper electrode 61 is charged negatively and the lower electrodes 62 are charged positively. This applied pattern is particularly effective in a case where the negatively-charged particles are used as the second particles B.

Concretely, it is insufficient for the second particles B to be allowed to thermally attach to the bottom surface of the reservoir portion 33. Therefore, the second particles B, which are not fixed to the bottom surface (inner surface) of the reservoir portion 33, exist in the reservoir portion 33. That is, the second particles B are suspended in the dispersion medium 41.

Even such a case, the second particles B are allowed to remain on the bottom surface of the reservoir portion 33 by the applied pattern. This makes it possible to exhibit high display contrast without positioning the second particles B to the upper portion of the reservoir portion 33 in the white display state.

In the case where the positively-charged particles are used as the second particles B, a voltage is applied to between the upper electrode 61 and the lower electrodes 62 so that the upper electrode 61 is charged positively and the lower electrodes 62 are charged negatively. This applied pattern is particularly effective from the same reason as that described above.

In the electrophoretic display device 1 according to the present embodiment, the white display state and the black display state are selectable by selecting a state whether or not the voltage is applied to between the upper electrode 61 and the lower electrodes 62. In such a configuration, it is possible to display desired information (images) in the display section of the electrophoretic display device 1 by controlling the movement of the first particles A every the reservoir portion 33.

In the electrophoretic display device 1, it is understood that the first particles A function like a shutter due to the operating method of the electrophoretic display device 1 (movement of the first particles A) as described above. The shutter can switch a state that the second particles B unevenly distributing (being gathered) on the bottom surface of the reservoir portion 33 are visible and a state that that the second particles B unevenly distributing on the bottom surface of the reservoir portion 33 are invisible.

As described above, the state that the first particles A are dispersed in the dispersion medium 41 as shown in FIGS. 1 and 2 is changed (switched) to the state that the particle aggregates A' are formed in the reservoir portion 33 as shown in FIGS. 4 and 5. At this time, by adopting the configuration as described above, a moving distance of the first particles A becomes a relatively short in the reservoir portion 33. Therefore, it is possible to improve responsiveness of changing the display color.

More concretely, a conventional electrophoretic display device is constituted so as to select either a white display state or a black display state. The white display state is a state that white particles and black particles are unevenly distributed to an upper electrode and lower electrodes, respectively. The black display state is a state that the white particles and the black particles are unevenly distributed to the lower electrodes and the upper electrode, respectively.

In such a conventional electrophoretic display device, when one display color is switched to the other display color, each of the white and black particles have to be moved (electrophoresed) in the substantially same distance (distance between electrodes) as that between the upper electrode and the lower electrodes. Therefore, in such a conventional electrophoretic display device, the moving distances of the white particles and the black particles become long, thereby lowering responsiveness (reactivity) of changing the display color.

In contrast, in the electrophoretic display device according to the present invention, the state that the first particles A are dispersed in the dispersion medium 41 as shown in FIGS. 1 and 2 is changed to the state that the particle aggregates A' are formed in the reservoir portion 33 as shown in FIGS. 4 and 5. At this time, according to the electrophoretic display device 1 of the present invention, a moving distance of the first particles A can be short as compared with that of the conventional electrophoretic display device as described above. Therefore, it is possible to improve responsiveness (reactivity) of changing the display color.

Further, in this embodiment, since the second particles B are fixed to the bottom surface (inner surface) of the reservoir portion 33, only the first particles A are moved in the dispersion medium 41. Therefore, it is possible to exhibit high display contrast without mixing the first particles A and the second particles B. For example, there is no phenomenon that the second particles B are surrounded between the large number of first particles A.

In other words, in the electrophoretic display device 1, it is possible to exhibit superior responsiveness (reactivity) as well as superior color display performance with high contrast in changing the display color.

In particular, in this embodiment, the white particles, which are the first particles A, are positioned above the colored part Be in the reservoir portion 33. Therefore, when the white display state is made, it is possible to clearly display the white color. When the black display state is made, it is possible to clearly display the black color without any white color influence.

In the case where the color of the first particles is opposite to the color of the second particles, the first particles of the black color are positioned above a colored part of the white color. Therefore, when a white display state is made, there is a fear that brightness of the white color is reduced due to particle aggregates of the black color.

Second Embodiment

Next, a description will be made on a second embodiment in which an electrophoretic display sheet according to the present invention is used in an electrophoretic display device (according to the present invention).

In this regard, views for explaining the electrophoretic display device in this embodiment are the same as those of FIGS. 1, 2, 4, and 5 which have been used for explaining the electrophoretic display device 1 in the first embodiment. Therefore, the views are omitted in this embodiment.

Hereinafter, a description will be made by focusing on different points from the first embodiment about the electrophoretic display device according to second embodiment and a description on the common points is omitted.

The electrophoretic display device 1 according to the second embodiment of the present invention is the same as that according to the first embodiment except that the first particles A are charged positively or negatively. In this regard, it is to be noted that a reference numeral of each configuration of the electrophoretic display device 1 according to the second embodiment is the same as that of each configuration of the electrophoretic display device 1 according to the first embodiment.

In this embodiment, particles having the opposite polarity as that of the second particles B are used as the first particles A. That is to say, if the second particles B are negatively-charged particles, the first particles A are positively-charged particles. If the second particles B are positively-charged particles, the first particles A are negatively-charged particles. Hereinafter, a description will be made as a representative a case where the positively-charged particles are used as the first particles A for the purpose of convenient in the description.

If a charge level of the first particles A is too high, the first particles A are moved to a negatively-charged electrode (an electrode having low electric potential) of the upper electrode 61 and the lower electrodes 62 when a voltage is applied to between the upper electrode 61 and the lower electrodes 62. Therefore, there is a case that it is difficult to normally exhibit an electrorheological effect that the first particles A are arranged in chains along a direction of an electric field.

Therefore, in this embodiment, the charge level of the first particles A is set low in a degree of dominantly generating the electrorheological effect when the electric field is generated in the reservoir portion 33. In other words, when the electric field is generated in the reservoir portion 33, the charge level of the first particles A is set as follows. Dipolar interaction force working between a pair of first particles A becomes larger than electrostatic force working to the first electrodes A so that the first particles A are moved to the negatively-charged electrode.

A method of adjusting the charge level of the first particles A is not limited to a specific method. There is a case that particles, which are consist of a ceramics material produced by subjecting surfaces of titania particles to an alumina treatment, are used as the first electrodes A. In such a case, if alumina of a sufficiently low amount is used in the alumina treatment, it is possible to obtain the first particles A having the characteristics as described above.

In this way, by using the positively-charged first particles A, it is possible to reliably separate the first particles A and the second particles B in the dispersion liquid 4. This is because the first particles A are moved to the first (upper) electrode 61, that is, to the opposite direction as a moving direction of the second particles B.

At this time, in order to fix the second particles B to the bottom surface of the reservoir portion 33 as described in the first embodiment, a relatively strong voltage is applied to between the upper electrode 61 and the lower electrodes 62 for a long period of time. As a result, it is possible to prevent the first particles A from being involved (surrounded) in the colored part B', thereby improving the display contrast.

Further, the black display state is made by applying a voltage to between the upper electrode 61 and the lower electrodes 62 so that the upper electrode 61 is charged negatively and the lower electrodes 62 are charged positively. At this time, the first particles A are gathered in predetermined positions of the reservoir portion 33 so as to make rows along the direction of the electric field while moving the first particles A to the upper electrode 61.

Therefore, it is possible to arrange a plurality of particle aggregates A' to the predetermined positions of the reservoir portion 33. That is, each one end particle of plurality of particle aggregates A' is positioned on the lower surface of the cover body 32. This makes it possible to more clearly display the black color.

According to the second embodiment as described above, it is also possible to exhibit the same effects as those of the first embodiment.

Third Embodiment

Next, a description will be made on a third embodiment in which an electrophoretic display sheet according to the present invention is used in an electrophoretic display device (according to the present invention).

Figure 6:
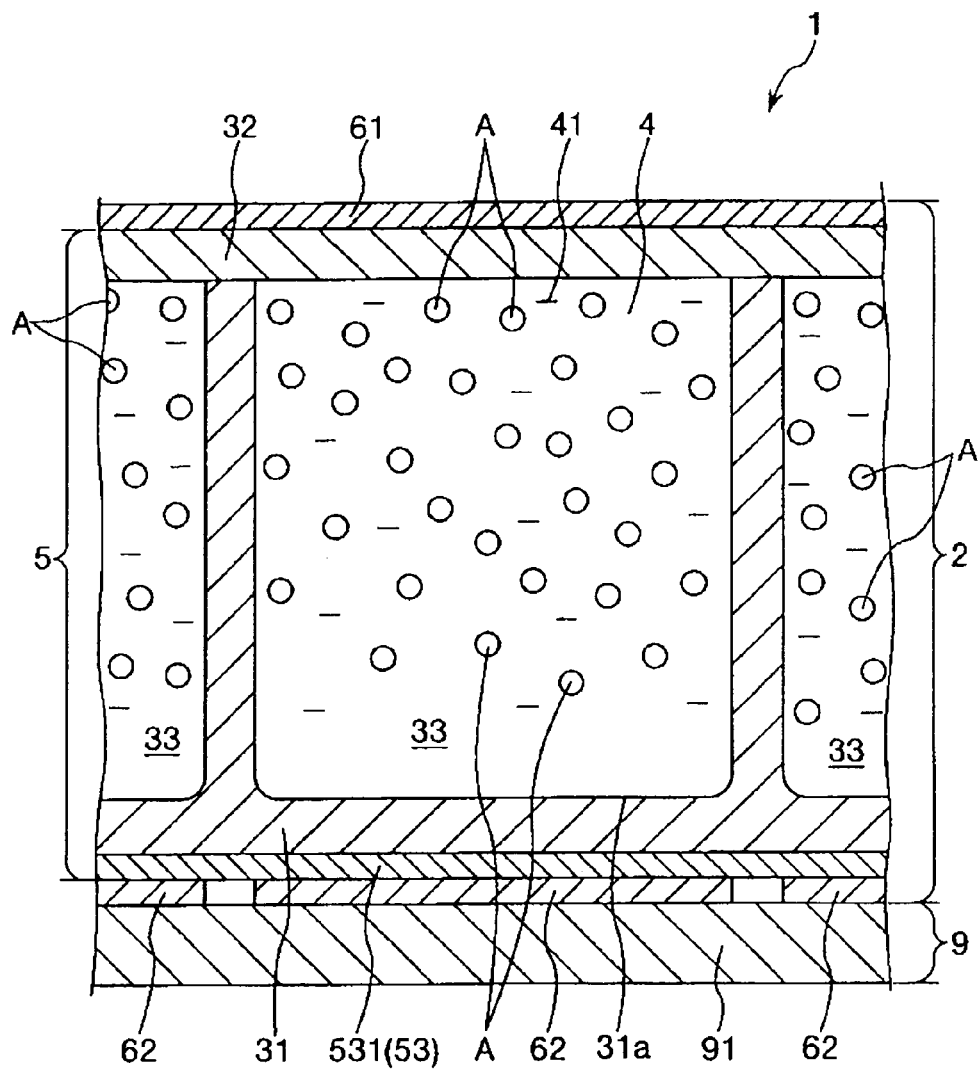
FIG. 6 is a vertical section view schematically showing an electrophoretic display device of a third embodiment according to the present invention.
Figure 7:
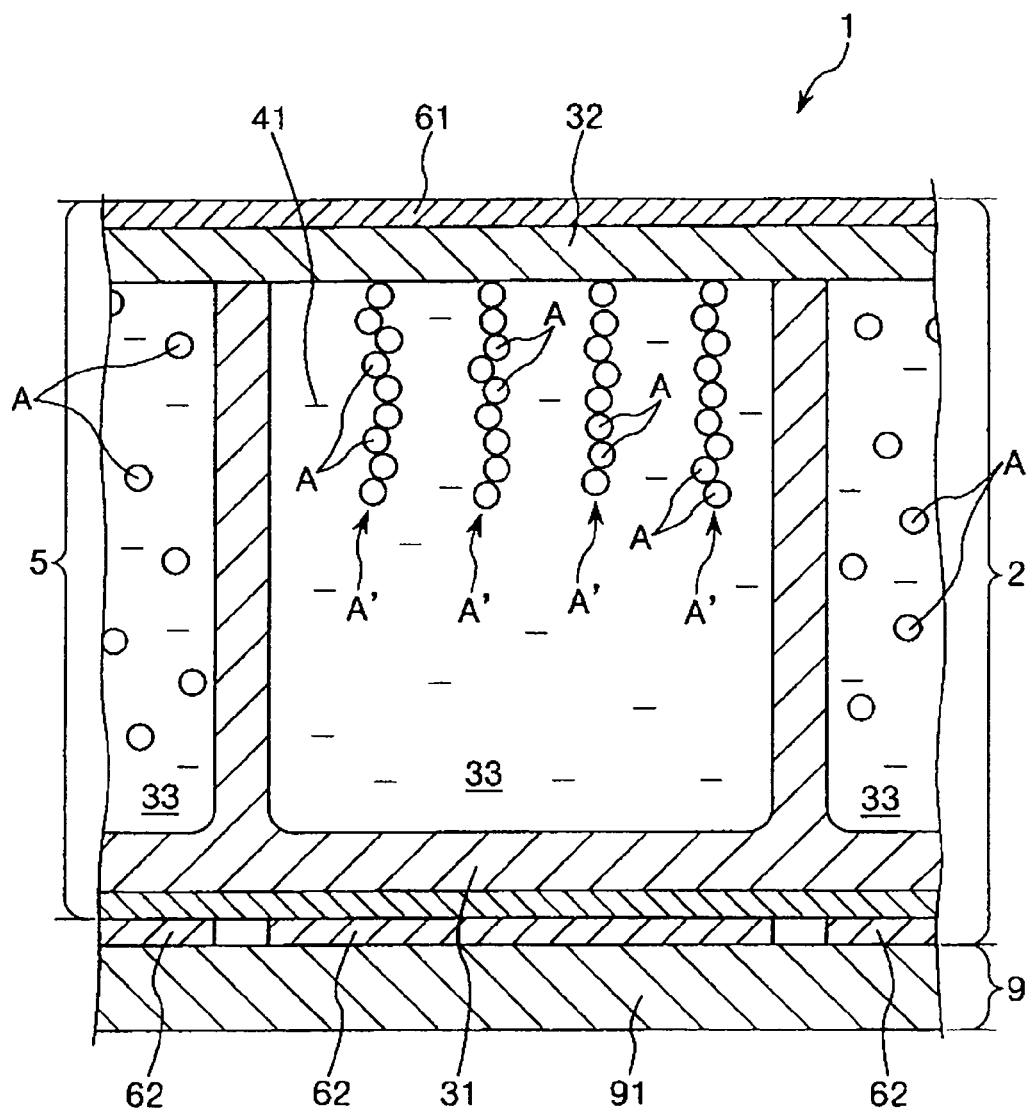
FIG. 7 is a schematically vertical section view for explaining an operating method of the electrophoretic display device shown in FIG. 6.

FIG. 6 is a vertical section view schematically showing an electrophoretic display device of a third embodiment according to the present invention. FIG. 7 is a schematically vertical section view for explaining an operating method of the electrophoretic display device shown in FIG. 6. Hereinafter, the upper side in FIGS. 6 and 7 will be referred to as "upper" and the lower side will be referred to as "lower".

Hereinafter, a description will be made by focusing on different points from the first embodiment about the electrophoretic display device according to third embodiment and a description on the common points is omitted.

The electrophoretic display device 1 according to the third embodiment of the present invention is the same as that according to the first embodiment except that the display layer 5 are different. In this regard, it is to be noted that a reference numeral of each configuration of the electrophoretic display device 1 according to the third embodiment is the same as that of each configuration of the electrophoretic display device 1 according to the first embodiment.

In the display layer 5 of this embodiment, the base body 31 and the cover body 32 are clear and colorless, respectively. The dispersion liquid 4 in which the first particles A having the electrorheological effect are dispersed is filled in the reservoir portion 33. That is to say, the second particles B as described in the first embodiment are not included in the dispersion liquid 4.

The display layer 5 of this embodiment has a colored part 53 exchanged for the colored part B' which is constituted from the second particles B. The colored part 53 is constituted from a colored film 531 of which color is different from the color of the first particles A. Such a colored film 531 is provided on the lower surface of the base body 31 (between the base body 31 and lower electrodes 62).

This makes it possible to form the colored part 53 with relative ease. Further, since the colored film 531 is not in contact with the dispersion medium 41, it is possible to prevent the colored film 531 from being deteriorated. That is, generation of color fade-out or color heterogeneity is prevented.

The color of the colored film 531 is not limited to a specific color as long as it is different from the color of the first particles A. Examples of the color of the colored film 531 include an achromatic color such as a white color, a black color, and an intermediate color therebetween (gray color); a chromatic color such as a red color, a blue color, and a green color. Hereinafter, a description will be made on the colored film 531 of the black color for the purpose of convenient in the description.

A method of forming the colored film 531 is not limited to a specific method. For example, the colored film 531 may be formed by bonding a colored sheet-like member to the lower surface of the base body 31 through a transparent adhesive. Further, the colored film 531 may be formed by applying a polymer solution to the lower surface of the base body 31 or the upper surfaces of the lower electrodes 62.

Examples of a method of applying such a polymer solution include a knife-coat method, a roll-coat method, a gravure-coat method, and the like. In this regard, such a polymer solution is colored by dispersing pigments, dyes or the like therein.

An operating method of the electrophoretic display device 1 according to this embodiment is the same as that of the electrophoretic display device 1 according to first embodiment described above.

A simple explanation of the operating method of the electrophoretic display device 1 follows. When no voltage is applied to between the upper electrode 61 and the lower electrodes 62, the first particles A are dispersed in the dispersion medium 41 as shown in FIG. 6. Therefore, the colored part 53 can not be visibly observed. This is a white display state.

Conversely, when a voltage is applied to between the upper electrode 61 and the lower electrodes 62, the first particles A are locally gathered under the lower surface of the cover body 32 and then particle aggregates A' are formed as shown in FIG. 7. Therefore, the colored part 53 can be visibly observed through gaps between the particle aggregates A'. This is a black display state.

According to the third embodiment as described above, it is also possible to exhibit the same effects as those of the first embodiment.

Fourth Embodiment

Next, a description will be made on a fourth embodiment in which an electrophoretic display sheet according to the present invention is used in an electrophoretic display device (according to the present invention).

Figure 8:
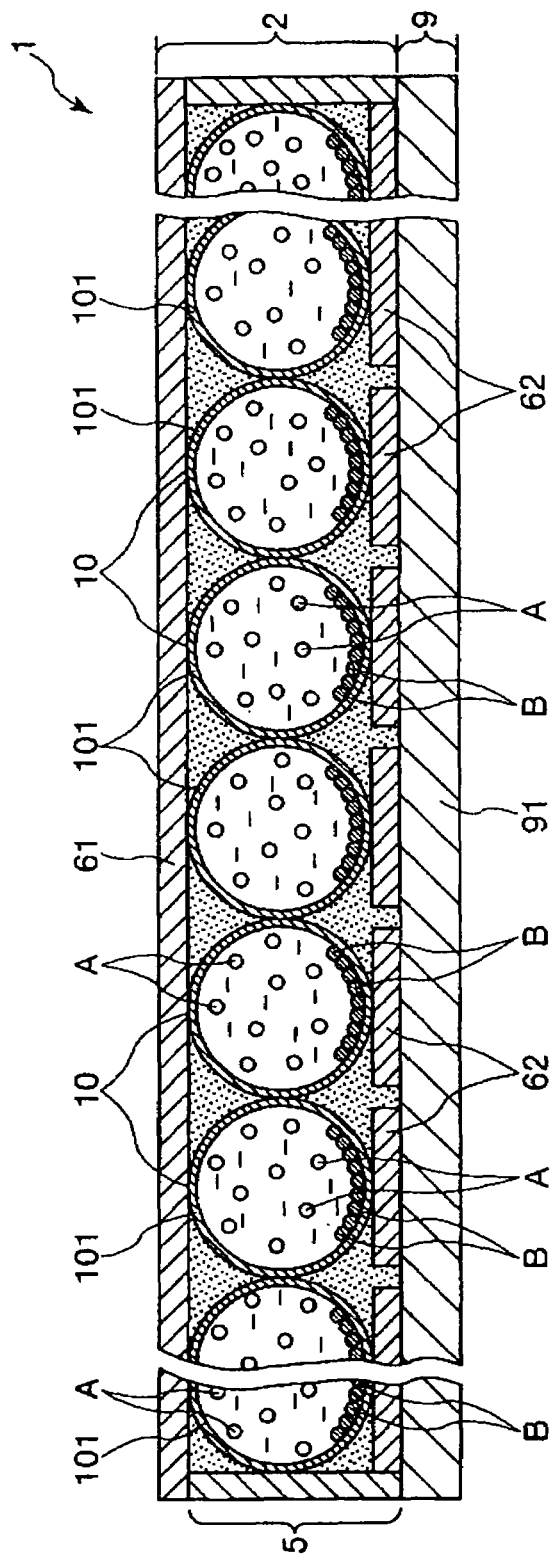
FIG. 8 is a vertical section view schematically showing an electrophoretic display device of a fourth embodiment according to the present invention.
Figure 9:
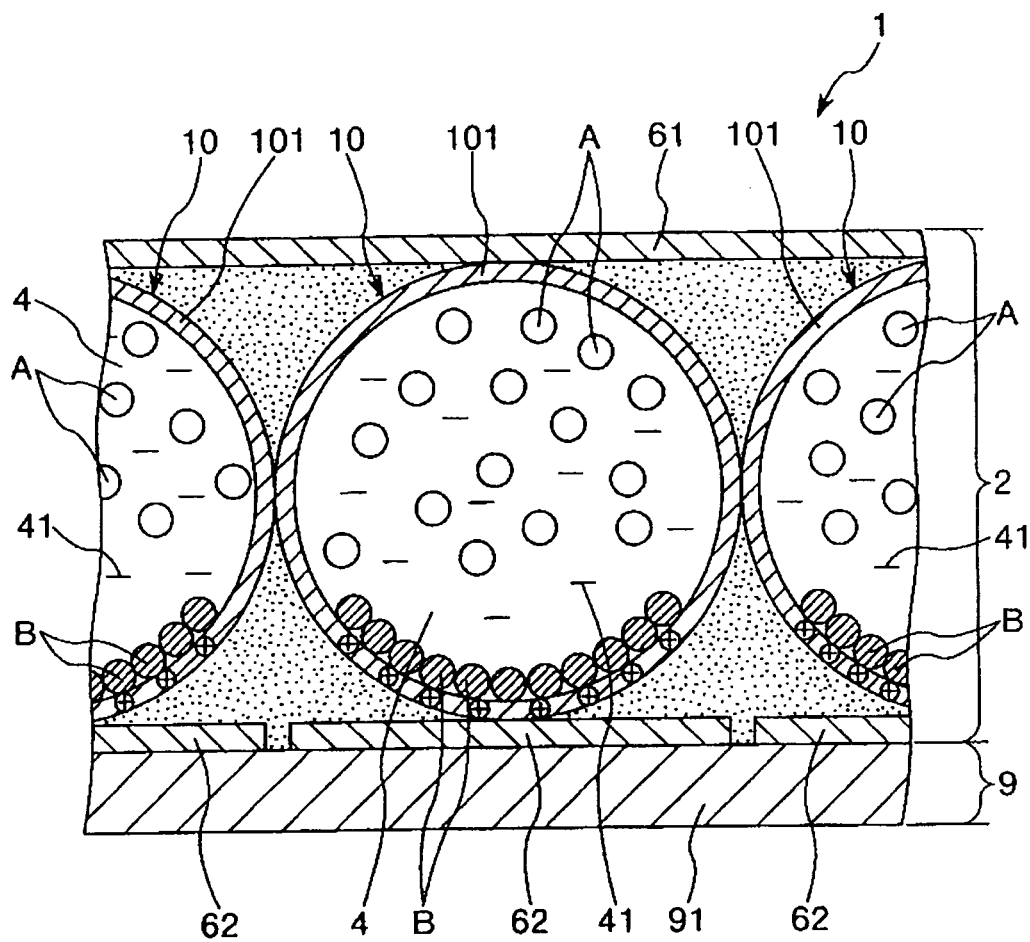
FIG. 9 is a partially-enlarged vertical section view showing a part of the electrophoretic display device shown in FIG. 8.

FIG. 8 is a vertical section view schematically showing an electrophoretic display device of a fourth embodiment according to the present invention. FIG. 9 is a partially-enlarged vertical section view showing the electrophoretic display device shown in FIG. 8.

Hereinafter, a description will be made by focusing on different points from the first embodiment about the electrophoretic display device according to fourth embodiment and a description on the common points is omitted.

The electrophoretic display device 1 according to the fourth embodiment of the present invention is the same as that according to the first embodiment except that the display layer 5 are different. In this regard, it is to be noted that a reference numeral of each configuration of the electrophoretic display device 1 according to the fourth embodiment is the same as that of each configuration of the electrophoretic display device 1 according to the first embodiment.

As shown in FIG. 8, the display layer 5 according to this embodiment includes a plurality of microcapsules 10 each having a capsule body (shell) 101 filled with (encapsulating) the dispersion liquid 4, and a binder 9 for fixing (or holding) the microcapsules 10.

The microcapsules 10 are disposed between the upper electrode 61 and the lower electrodes 62 in a monolayer so as to arrange in a matrix in a plane side by side a relation. That is, the microcapsules 10 are disposed between the upper electrode 61 and the lower electrodes 62 one by one so as not to overlap in a thickness direction of the display layer 5.

In this embodiment, the microcapsules 10 are kept in a generally spherical shape without being compressed (pressed) in an up-and-down direction, even if they are sandwichedly held by between the upper electrode 61 and the lower electrodes 62.

In this regard, it is to be noted that the microcapsules 10 are not limited to the spherical shape, but may be formed into, e.g., a generally elliptical shape or rectangle shape in a vertical section shape, by pressing in the up-and-down direction.

Further, in this embodiment, the microcapsules 10 are aligned with one lower electrode 62 as shown in FIGS. 8 and 9, but the present invention is not limited thereto. For example, each microcapsule 10 may be aligned with adjacent two lower electrodes 62 so as to be provided on them.

A volume-average particle size of the capsule body 101 is preferably in the range of 30 to 60 μm, and more preferably in the range of 40 to 50 μm. By setting the volume-average particle size of the capsule body 101 within the above range, it is possible to form the display layer 5 with good dimensional accuracy.

As shown in FIG. 9, such a capsule body 101 is charged to the opposite polarity as that of the second particles B. This makes it possible to unevenly distribute (gather) the second particles B so as to be in contact with an inner surface (lower inner surface) of the capsule body 101. In particular, by charging only lower capsule body 101 to the opposite polarity as that of the second particles B, it is possible to reliably unevenly distribute the second particles B to the lower inner surface into the capsule body 101.

A method of charging the capsule body 101 is not limited to a specific method, but examples of the method include the following method.

In the case where the capsule body 101 is charged positively, the method includes: mixing a positively charging control agent to an acryl resin or an alkyd resin to obtain a resin mixture; dissolving the resin mixture to an organic solvent such as toluene, butyl acetate, and ethyl acetate to obtain a resin mixture solution; applying the resin mixture solution to the surface of the capsule body 101 to obtain the positively-charged capsule body 101. Examples of the positively charging control agent include a nigrosin dye, triphenyl methane dye, quaternary ammonium bases, and the like.

Conversely, in the case where the capsule body 101 is charged negatively, the method includes: mixing a negatively charging control agent to an acryl resin or an alkyd resin to obtain a resin mixture; dissolving the resin mixture to an organic solvent such as toluene, butyl acetate, and ethyl acetate to obtain a resin mixture solution; applying the resin mixture solution to the surface of the capsule body 101 to obtain the negatively-charged capsule body 101. Examples of the negatively charging control agent include a salicylate-based compound, boron-based compound, and the like.

Examples of a constituent material of the capsule body (shell) 101 include various kinds of resin materials such as an urethane-based resin, a melamine-based resin, an urea resin, a polyamide, a polyether, and the like. One or more of these materials may be used independently or in combination.

In this embodiment, adjacent microcapsules 10 may be arranged to each other in a contact manner, but a separate manner.

The dispersion medium 41, the first particles A, and the second particles B are filled into the microcapsules 10. The second particles B are charged negatively, and electrically adsorbed to the lower inner surface of the capsule body 101 which is charged positively. This adsorbed second particles B constitute a colored part B'.

According to the fourth embodiment as described above, it is also possible to exhibit the same effects as those of the first embodiment. In this regard, the second particles B may be fixed to the lower inner surface of the capsule body 101 by thermally attaching as the first embodiment described above without charging of the capsule body 101.

Fifth Embodiment

Next, a description will be made on a fifth embodiment in which an electrophoretic display sheet according to the present invention is used in an electrophoretic display device (according to the present invention).

Figure 10:
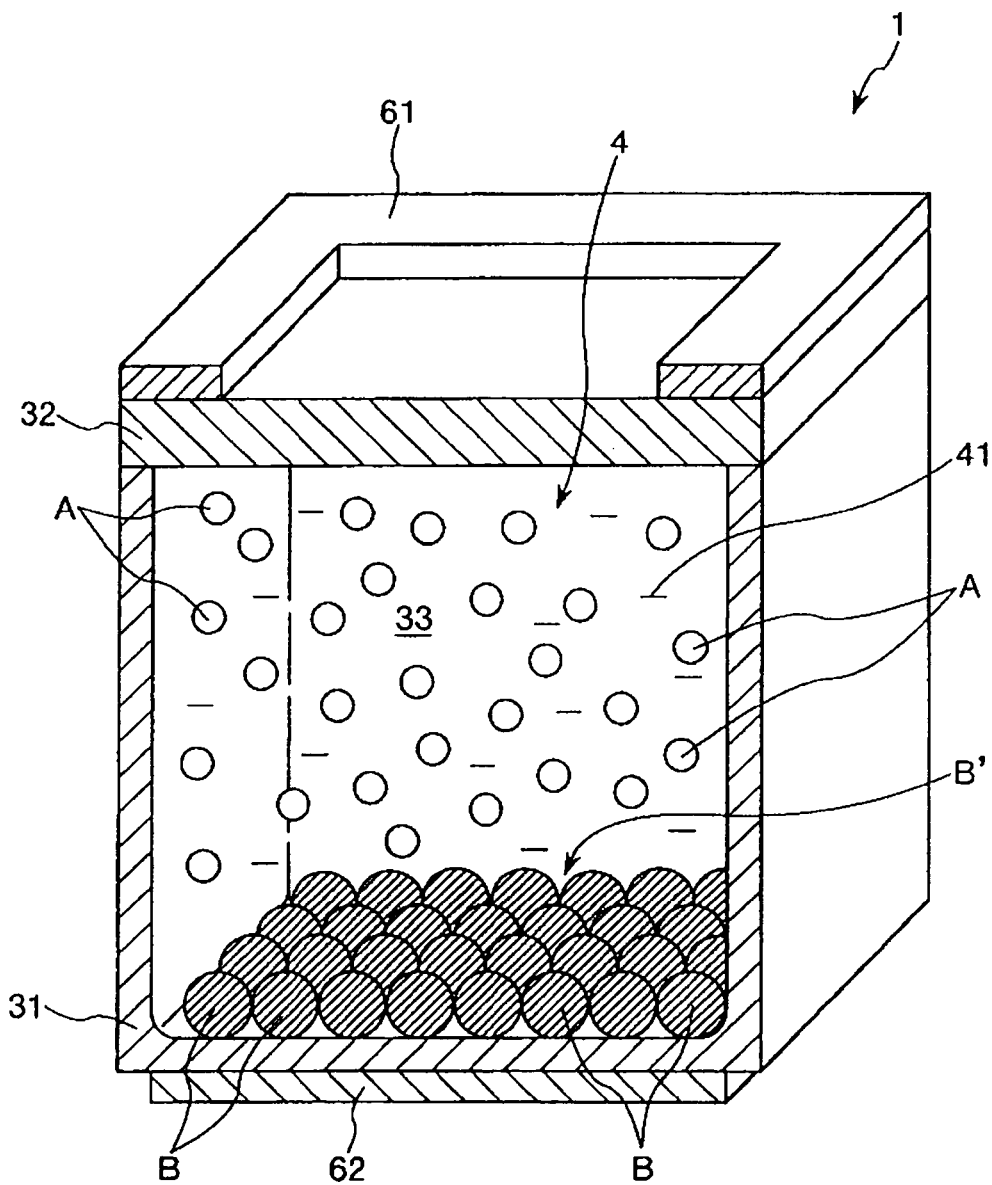
FIG. 10 is a perspective vertical section view schematically showing an electrophoretic display device of a fifth embodiment according to the present invention.
Figure 11:
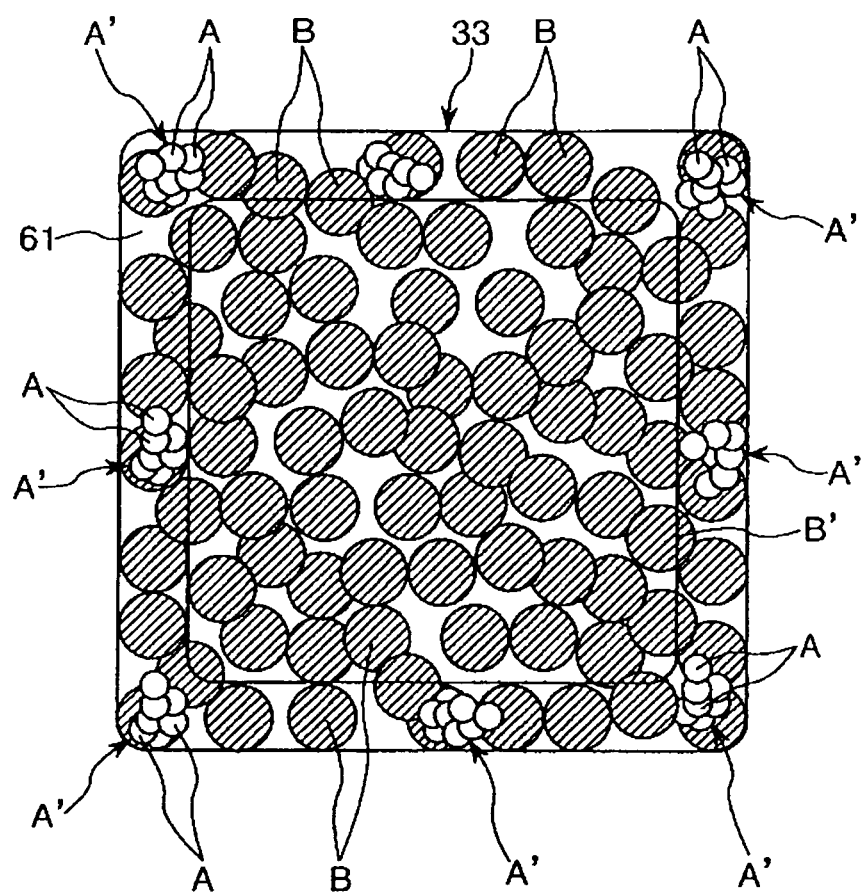
FIG. 11 is a plane view (top view) schematically showing the electrophoretic display device shown in FIG. 10.

FIG. 10 is a perspective vertical section view schematically showing an electrophoretic display device of a fifth embodiment according to the present invention. FIG. 11 is a plane view (top view) schematically showing the electrophoretic display device shown in FIG. 10.

In this regard, it is to be noted that a description will be made as a representative one reservoir portion for the purpose of convenient in the description in FIGS. 10 and 11 and the other reservoir portions are omitted. Configurations of the other reservoir portions are the same as that of the one reservoir.

Hereinafter, a description will be made by focusing on different points from the first embodiment about the electrophoretic display device according to fifth embodiment and a description on the common points is omitted.

The electrophoretic display device 1 according to the fifth embodiment of the present invention is the same as that according to the first embodiment except that a configuration of an upper electrode 61 is different. In this regard, it is to be noted that a reference numeral of each configuration of the electrophoretic display device 1 according to the fifth embodiment is the same as that of each configuration of the electrophoretic display device 1 according to the first embodiment.

FIG. 11 is a plane view when the electrophoretic display device 1 is viewed from the above thereof (that is, above the upper electrode 61). As shown in FIG. 11, in this embodiment, the upper electrode 61 is provided on the cover body 32 corresponding to a peripheral edge portion of the reservoir portion 33 in a planar view of the display layer 5.

This makes it possible to gather a plurality of particle aggregates A' to the peripheral edge portion of the reservoir portion 33 (under the upper electrode 61) as shown in FIG. 11 when a voltage is applied to between the upper electrode 61 and the lower electrodes 62. Therefore, it is possible to form a large space which is the central portion of the reservoir portion 33 and in which no particle aggregates A' exist. This makes it possible to display a more clear black, namely an original or a black color of the second particles B themselves, in the black display state.

As described above, in this embodiment, the upper electrode 61 is provided on the cover body 32 so as to be gathered in a predetermined portion of the cover body 32 (peripheral edge portion) in the planar view of the display layer 5.

When the voltage is applied to between the upper electrode 61 and the lower electrodes 62, the electrophoretic display device 1 according to this embodiment works so as to gather the first particles A in the reservoir portion 33 under the predetermined portion. Since this makes it possible to determine (decide) positions in the reservoir portion 33 where the first particles A are gathered, it is possible to display the clearly black color.

Further, in this embodiment, even if the white display and the black display are switched to each other many times, it is possible that a black color of a first black display state is the substantially same color as that of a second black display state. Therefore, the electrophoretic display device 1 according to this embodiment is especially advantageous in a case where moving images or a slide show like frequently switching images are displayed.

As shown in FIG. 11, the upper electrode 61 of this embodiment has a annular structure in a roughly-quadrangular shape when the one reservoir portion 33 is viewed. In other words, when the upper electrode 61 is viewed as a whole, the upper electrode 61 is formed in a reticular pattern, which is corresponded to a plurality of reservoir portions 33.

However, a shape (planar-viewed shape) of the upper electrode 61 is not limited to a specific shape. Such a shape may be substantially "U-shaped" along the peripheral edge portion of the reservoir portion 33. Further, the upper electrode 61 may be formed so that a plurality of electrode pieces are intermittently provided on the cover body 32 corresponding to the peripheral edge portion of the reservoir portion 33.

According to the fifth embodiment as described above, it is also possible to exhibit the same effects as those of the first embodiment.

Sixth Embodiment

Next, a description will be made on a sixth embodiment in which an electrophoretic display sheet according to the present invention is used in an electrophoretic display device (according to the present invention).

Figure 12:
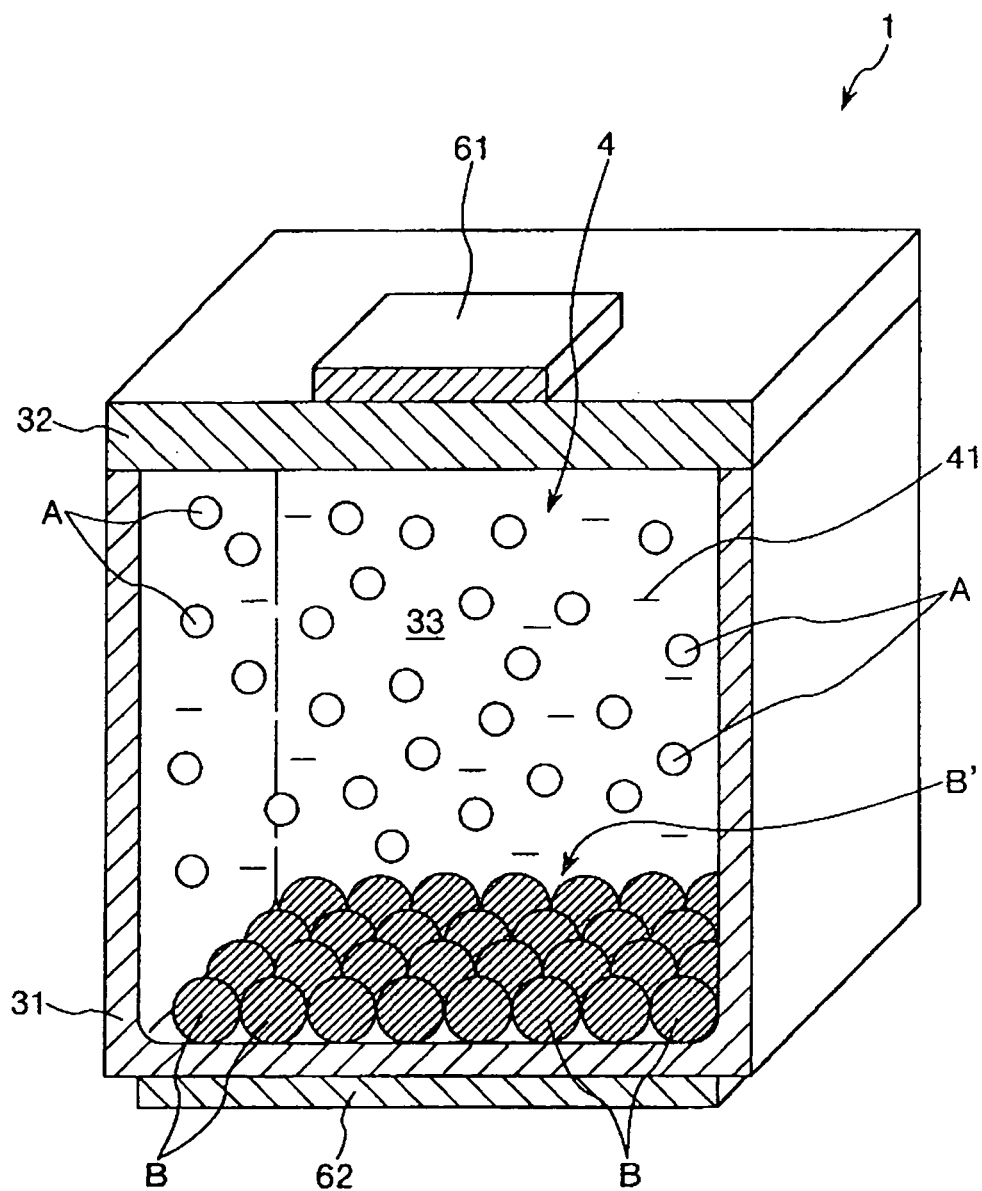
FIG. 12 is a perspective vertical section view schematically showing an electrophoretic display device of a sixth embodiment according to the present invention.
Figure 13:
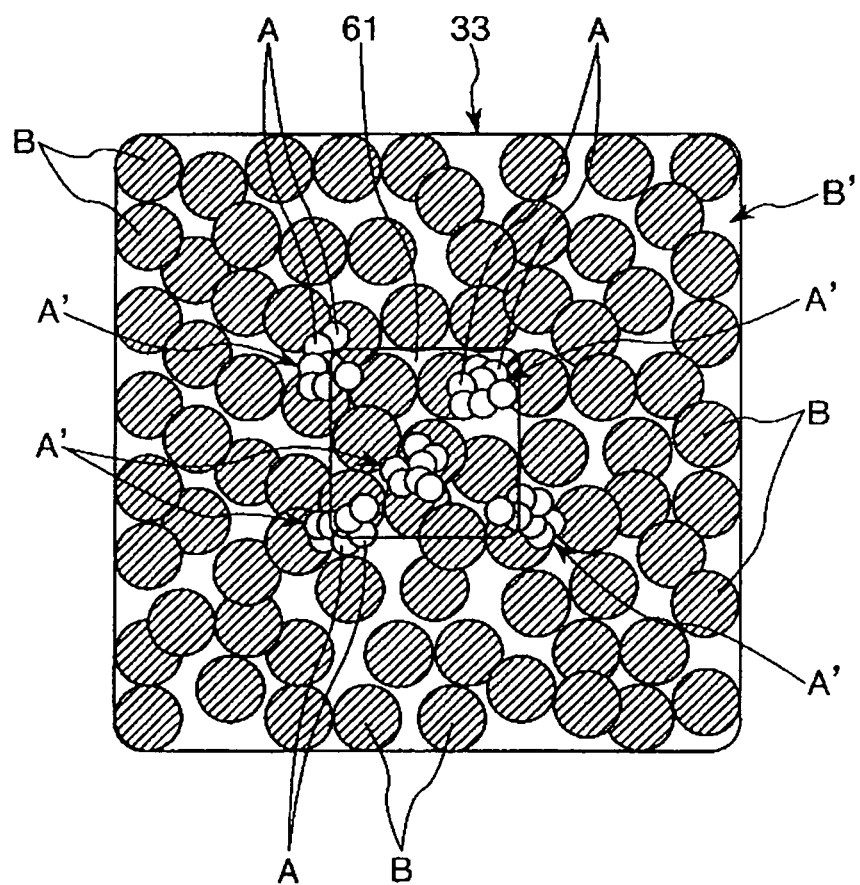
FIG. 13 is a plane view (top view) schematically showing the electrophoretic display device shown in FIG. 12.

FIG. 12 is a perspective vertical section view schematically showing an electrophoretic display device of a sixth embodiment according to the present invention. FIG. 13 is a plane view (top view) schematically showing the electrophoretic display device shown in FIG. 12.

In this regard, it is to be noted that a description will be made as a representative one reservoir portion for the purpose of convenient in the description in FIGS. 12 and 13 and the other reservoir portions are omitted. Configurations of the other reservoir portions are the same as that of the one reservoir portion.

Hereinafter, a description will be made by focusing on different points from the first embodiment about the electrophoretic display device according to sixth embodiment and a description on the common points is omitted.

The electrophoretic display device 1 according to the sixth embodiment of the present invention is the same as that according to the first embodiment except that a configuration of the upper electrode 61 are different. In this regard, it is to be noted that a reference numeral of each configuration of the electrophoretic display device 1 according to the sixth embodiment is the same as that of each configuration of the electrophoretic display device 1 according to the first embodiment.

FIG. 13 is a plane view when the electrophoretic display device 1 is viewed from the above thereof (that is, above the upper electrode 61). As shown in FIG. 13, in this embodiment, the upper electrode 61 is provided on the cover body 32 corresponding to a central portion of the reservoir portion 33 in a planar view of the display layer 5.

In this regard, it is to be noted that all of a plurality of upper electrodes 61 corresponding to reservoir portions 33 are electrically connected to each other through conductive wires not to be shown in draws. This constitutes a common electrode.

The use of the upper electrodes 61 having such a configuration is makes it possible to gather a plurality of particle aggregates A' to the central portion of the reservoir portion 33 (under the upper electrode 61) as shown in FIG. 13 when a voltage is applied to between the upper electrodes 61 and the lower electrodes 62. That is, it is possible to gather the plurality of particle aggregates A' under the lower surface of the cover body 32 corresponding to the upper electrode 61 as shown in FIG. 13.

Therefore, as shown in FIG. 13, it is possible to form a large space which is a space (portion) other than the central portion of the reservoir portion 33 and in which no particle aggregates A' exist. This makes it possible to display a more clear black, namely an original or a black color of the second particles B themselves, in the black display state.

According to the sixth embodiment as described above, it is also possible to exhibit the same effects as those of the first embodiment.

The electrophoretic display device 1 as described above can be used in display parts of various kinds of electronic devices.

Examples of uses of the electronic device of present invention provided with the electrophoretic display device 1 include an electronic paper, an electronic book, a television set, a viewfinder type or monitor viewing type video tape recorder, a car navigation system, a pager, a personal digital assistance, an electronic calculator, an electronic newspaper, a word processor, a personal computer, a workstation, a picture phone, a POS terminal, a device provided with a touch panel and the like.

Among the electronic devices, a description will be offered regarding an embodiment in which the electronic device of the present invention is used in an electronic paper.

Figure 14:
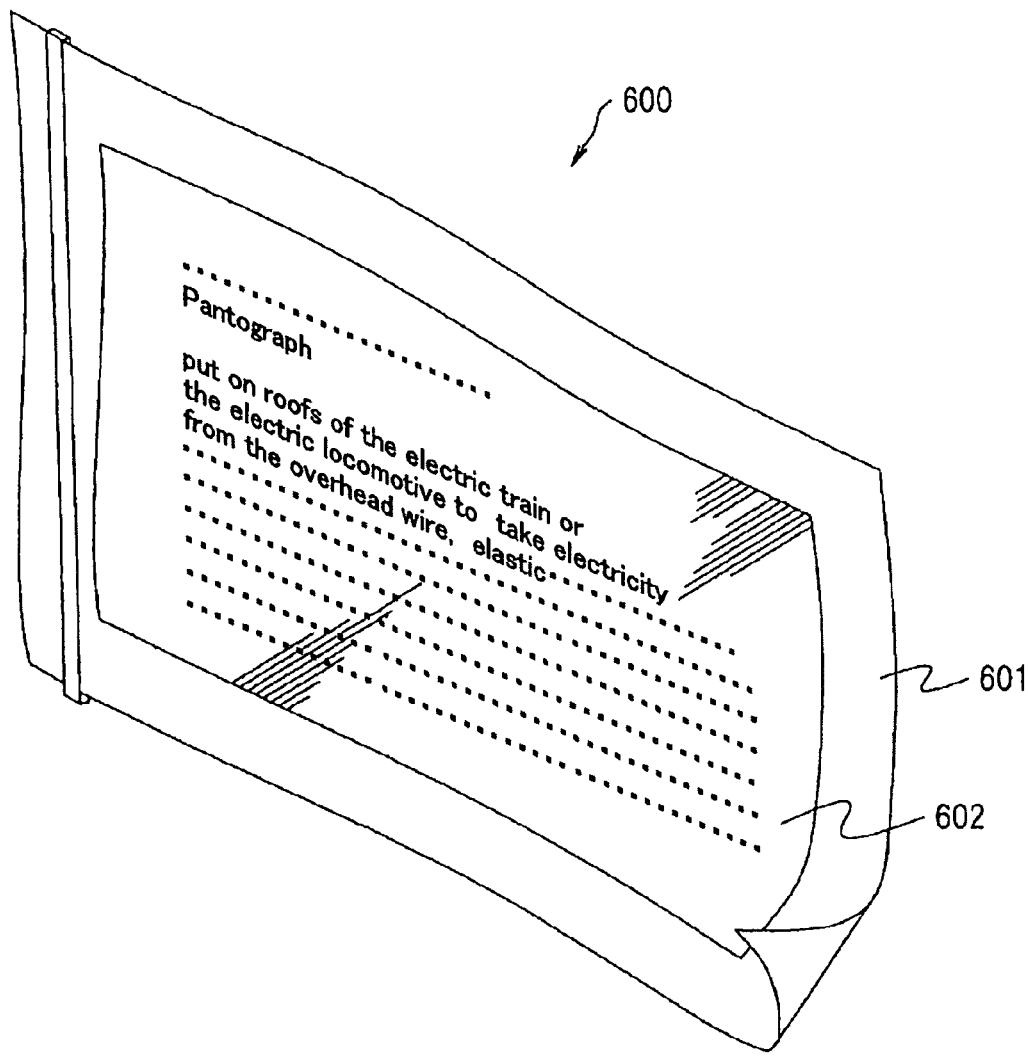
FIG. 14 is a perspective view showing an embodiment in which the electronic device according to the present invention is used in an electronic paper.

FIG. 14 is a perspective view showing an embodiment in which the electronic device according to the present invention is used in an electronic paper.

The electronic paper 600 shown in FIG. 14 includes a main body 601 formed of a rewritable sheet having the same texture and flexibility as that of a paper sheet, and a display unit 602 attached to the main body 601. In the electronic paper 600, the display unit 602 is formed from the electrophoretic display device 1 described above.

Figure 15A:
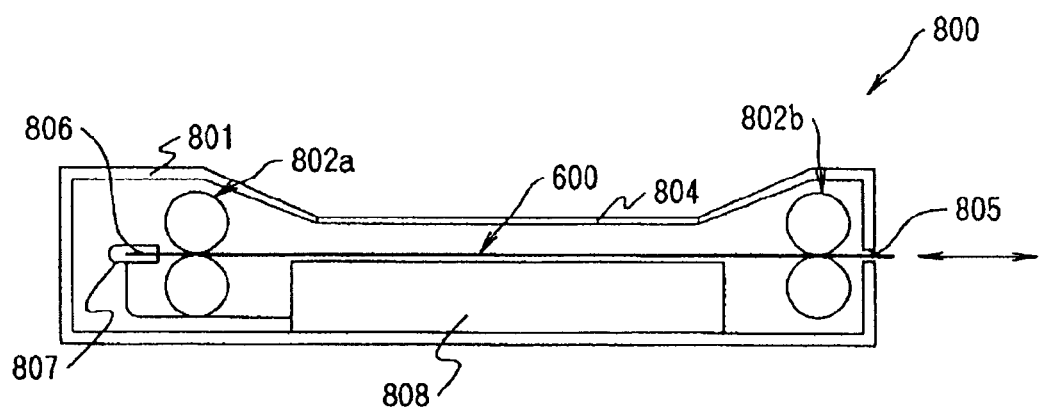
FIGS. 15A and 15B are section and plan views showing an embodiment in which the electronic device according to the present invention is used in a display device.
Figure 15B:
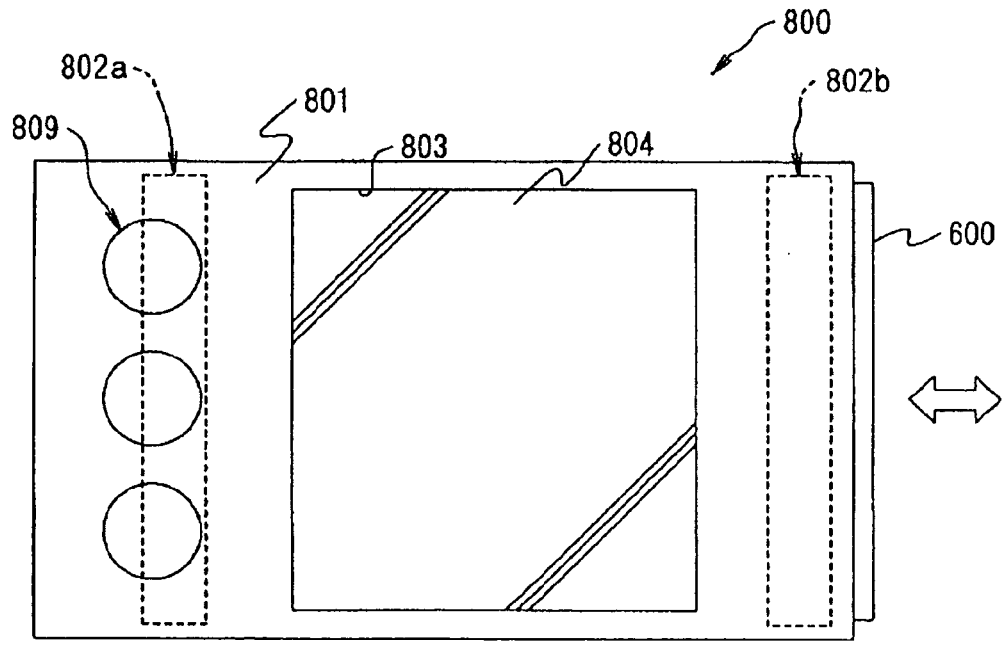

Next, a description will be offered regarding an embodiment in which the electronic device of the present invention is used in a display device. FIGS. 15A and 15B are section and plan views showing an embodiment in which the electronic device according to the present invention is used in a display device.

The display device 800 shown in FIGS. 15A and 15B include a main body portion 801 and an electronic paper 600 detachably attached to the main body portion 801. The electronic paper 600 is of the same configuration as set forth above, i.e., the same configuration as shown in FIG. 14.

Formed on one lateral side (the right side in FIG. 15A) of the main body portion 801 is an insertion slot 805 through which the electronic paper 600 can be inserted. Two pairs of conveying rollers 802a and 802b are provided within the main body portion 801.

When the electronic paper 600 is inserted into the main body portion 801 through the insertion slot 805, the electronic paper 600 is held within the main body portion 801 in a state that it is gripped by means of the pairs of conveying rollers 802a and 802b.

A rectangular opening 803 is formed on a display surface side (the front side in FIG. 15B) of the main body portion 801 and a transparent glass plate 804 is fitted to the rectangular opening 803. This allows the electronic paper 600 held within the main body portion 801 to be visually recognized from the outside of the main body portion 801.

In other words, the display device 800 has a display surface that allows the electronic paper 600 held within the main body portion 801 to be visually recognized through the transparent glass plate 804.

A terminal portion 806 is formed in a leading edge portion (the left side in FIGS. 15A and 15B) of the electronic paper 600. Provided within the main body portion 801 is a socket 807 that makes contact with the terminal portion 806 when the electronic paper 600 is placed within the main body portion 801. A controller 808 and an operation part 809 are electrically connected to the socket 807.

In the display device 800 set forth above, the electronic paper 600 is removably fitted to the main body portion 801 and is portable in a state that it is removed from the main body portion 801.

Although the electrophoretic display sheet, the electrophoretic display device and the electronic device of the present invention have been described with reference to the illustrated embodiments, the present invention is not limited thereto. In the electrophoretic display sheet, the electrophoretic display device and the electronic device, the configuration of each component may possibly be replaced by other arbitrary configurations having equivalent functions. It may also be possible to add other optional components to the present invention.

Further, it has been described in the embodiments described above that the colored part is constituted from the second particles or the colored film. However, the present invention is not limited thereto. The colored part may be constituted by coloring a bottom portion of the base body (portion between the concave portion and the lower surface of the base body) to a different color as that of the first particles A.

Furthermore, it has bee described in the embodiments described above that the display electrophoresis device is configured so that the electric field is generated in the one reservoir portion in the selectable manner. However, the present invention is not limited thereto. The display electrophoresis device is configured so that the electric field is generated in each of a plurality of reservoir portions such as two or three reservoir portions in a selectable manner.

In a case where the display electrophoresis device is configured so that the electric field is generated in two reservoir portions in a selectable manner, the lower electrodes (individual electrodes) may be formed on the circuit substrate so as to correspond to an adjacent pair of reservoir portions, that is two reservoir portions.

What is claimed is:

1. An electrophoretic display sheet comprising:
a display layer having one surface and an other surface opposite to the one surface,
a dispersion liquid in which first particles and second particles are dispersed, and
a plurality of reservoir portions provided between the one surface and the other surface, the plurality of reservoir portions being filled with the dispersion liquid in which the first particles and the second particles are dispersed, and the reservoir portions having predetermined positions and a bottom surface,
wherein the first particles exhibit an electrorheological effect and have at least one color, and
the second particles have a color that is different from the at least one color of the first particles;
a first electrode provided on the one surface of the display layer; and
second electrodes provided on the other surface of the display layer;
wherein
when a primary electric field is generated in the display layer by applying a primary voltage between the first electrode and the second electrodes, the second particles dispersed in the dispersion liquid constitute a colored part on the bottom surface of the reservoir portions by being fixed to the bottom surface of the reservoir portions impeding movement of the second particles in the dispersion liquid, and
when an electric field having a direction is generated in the display layer by applying a voltage between the first electrode and the second electrodes, the first particles dispersed in the dispersion liquid are locally gathered to the predetermined positions of the reservoir portions so as to make rows of the first particles along the direction of the electric field in the dispersion liquid due to the electrorheological effect, so that the colored part constituted of the second particles is visible through gaps between the rows of the first particles, and a color in the reservoir portions visibly observed through the rows of the first particles is the color of the second particles, while the second particles remain fixed to the bottom surface of the reservoir portions impeding the movement of the second particles in the dispersion liquid.

2. The electrophoretic display sheet as claimed in claim 1, wherein the at least one color of the first particles is a white color.

3. The electrophoretic display sheet as claimed in claim 1, wherein an average particle size of the first particles is in the range of 0.1 to 5 μm.

4. The electrophoretic display sheet as claimed in claim 1, wherein an amount of the first particles contained in the dispersion liquid is in the range of 15 to 35 wt %.

5. The electrophoretic display sheet as claimed in claim 1, wherein
the electrophoretic display sheet is configured so as to be capable of making a first state and a second state,
the first state being a state in which the voltage is applied between the first electrode and the second electrodes; and
the second state being a state in which no voltage is applied between the first electrode and the second electrodes, the first particles are locally gathered to the predetermined positions of the reservoir portions so as to make the rows of the first particles in the dispersion liquid re-dispersed in the dispersion liquid, so that the colored part is not visible, and a color in the reservoir portions visibly observed through the first electrode is the color of the first particles.

6. The electrophoretic display sheet as claimed in claim 1, wherein the second particles have positively-charged particles or negatively-charged particles.

7. The electrophoretic display sheet as claimed in claim 1, wherein
the first electrode is locally provided on the one surface of the display layer at a position corresponding to the predetermined positions of the reservoir portions in a planar view of the display layer, and the first particles are gathered to the predetermined positions when the voltage is applied between the first electrode and the second electrodes.

8. The electrophoretic display sheet as claimed in claim 7, wherein
the predetermined positions of the reservoir portions are a peripheral edge portion, and
the first electrode is provided on the one surface of the display layer corresponding to the peripheral edge portion of the reservoir portions in a planar view of the display layer.

9. The electrophoretic display sheet as claimed in claim 7, wherein
the predetermined positions of the reservoir portions are a central portion, the first electrode includes sub-first electrodes, and
each of the sub-first electrodes is provided on the one surface of the display layer corresponding to the central portion of the reservoir portions in a planar view of the display layer.

10. An electrophoretic display apparatus comprising:
the electrophoretic display sheet defined in claim 1; and
a substrate provided on the second electrodes of the electrophoretic display sheet.

11. The electrophoretic display apparatus claimed in claim 10, wherein the electrophoretic display device is configured so that the electric field is generated in each of the plurality of reservoir portions in a selectable manner.

12. An electronic device provided with the electrophoretic display apparatus as claimed in claim 11.

13. The electrophoretic display sheet as claimed in claim 1, the color part being comprised of the second particles.

14. The electrophoretic display sheet as claimed in claim 1, wherein an average particle diameter of the second particles is in the range of 0.1 to 5 μm.

15. The electrophoretic display sheet as claimed in claim 1, wherein
the first particles respectively have a surface on which polymers having affinity to the dispersion liquid are chemically bonded, and
a bonding number of the polymer bonded to the surface of each of the first particles is in the range of 300 to 2500 unit/μm$^2$.

16. The electrophoretic display sheet as claimed in claim 1, wherein when the primary electric field is generated in the display layer by applying the primary voltage between the first electrode and the second electrodes, the second particles are thermally fixed to the bottom surface of the reservoir portions impeding movement of the second particles in the dispersion liquid.

* * * * *